US008302882B2

(12) United States Patent
Nelson et al.

(10) Patent No.: US 8,302,882 B2
(45) Date of Patent: Nov. 6, 2012

(54) AREA-PROGRAMMABLE SPRINKLER

(76) Inventors: Rodney Lee Nelson, Spokane Valley, WA (US); LaLonni Lee Nilsson Nelson, Spokane Valley, WA (US)

( * ) Notice: Subject to any disclaimer, the term of this patent is extended or adjusted under 35 U.S.C. 154(b) by 261 days.

(21) Appl. No.: 12/804,417

(22) Filed: Jul. 21, 2010

(65) Prior Publication Data

US 2012/0018532 A1 Jan. 26, 2012

(51) Int. Cl.
*A01G 27/00* (2006.01)

(52) U.S. Cl. ........................................ 239/69; 239/225.1

(58) Field of Classification Search .................... 239/67, 239/69, 63, 201, 203, 225.1, 230, 233, 240, 239/242, 569

See application file for complete search history.

(56) References Cited

U.S. PATENT DOCUMENTS

| | | | | |
|---|---|---|---|---|
| 1,796,942 | A | 3/1931 | Pottenger, Jr. | |
| 3,362,641 | A | 1/1968 | Barnes | |
| 3,528,093 | A | 9/1970 | Eerkens | |
| 3,952,954 | A | 4/1976 | Taylor | |
| 4,004,612 | A * | 1/1977 | Hummel et al. | 137/624.11 |
| 4,819,875 | A | 4/1989 | Beal | |
| 4,852,802 | A * | 8/1989 | Iggulden et al. | 239/64 |
| 6,402,048 | B1 * | 6/2002 | Collins | 239/63 |
| 6,834,814 | B1 | 12/2004 | Beckman | |
| 7,494,070 | B2 * | 2/2009 | Collins | 239/63 |

* cited by examiner

*Primary Examiner* — Davis Hwu
(74) *Attorney, Agent, or Firm* — John S. Reid

(57) ABSTRACT

A sprinkler system which is controllable to provide water to an area to be sprinkled includes a sprinkler head to move between a first position and a second position. The sprinkler system further includes a sprinkler head positioner to move the sprinkler head between the first and second positions, a sprinkler head position determiner to determine a current sprinkler head position between the first and second positions, a flow control valve to control flow of water from a water supply to the sprinkler head, a flow control valve positioner to establish a current control valve position for the flow control valve between an essentially fully closed control valve position and an essentially fully open control valve position, and a controller to receive a sprinkler head position signal from the sprinkler head position determiner and send a control valve control signal to the flow control valve positioner in response thereto.

17 Claims, 18 Drawing Sheets

USER OPERATION FLOWCHART - SINGLE SPRINKLER APPLICATION - NEW POSITION EACH TIME

SYSTEM OPERATION FLOWCHART - SINGLE SPRINKLER OPERATION - NEW POSITION EACH TIME

SYSTEM OPERATION FLOWCHART - BASIC SINGLE SPRINKLER OPERATION - SAME POSITION EACH TIME

AREA-PROGRAMMABLE SPRINKLER

FIELD

This application generally pertains to water sprinklers for irrigating an intended area while reducing watering of areas outside of the intended area.

BACKGROUND

It is desirable that a sprinkler, or a sprinkler system, water only that area which is intended to be watered. Watering outside of the intended area not only wastes water, but can have other undesirable consequences if the water falls on areas or objects which are not intended to be watered. For example, if a sprinkler sprays water against the side of a house, this can lead to premature degradation of paint applied to the house. Likewise, if a sprinkler sprays water in an area which is not intended to be irrigated, this can promote weed growth in the unintended area.

By and large, most sprinkler heads intended for the irrigation of lawns and the like are configured to sprinkle in a circular pattern, or at least a pattern circumscribing a circular arc. For example, in-ground sprinkler systems utilize one or both of pop-up spray heads and/or rotary spray heads, both of which are typically limited to spraying in circular (or circular arc) spray patterns. Likewise, many free-standing moveable lawn sprinklers are also limited to spraying in circles or circular arcs.

Most in-ground water sprinkler systems employing pop-up spray heads and/or rotary spray heads are configured with the sprinkler heads positioned at corners or edges of the intended area to be watered. This facilitates (but does not ensure) watering the intended area, since the spray from the sprinkler heads is directed inward of the perimeter of the intended area. For example, for a square area intended to be watered (such as a common residential lawn or yard), a typical in-ground sprinkler system may include two sprinkler heads positioned at opposing corners of the yard. In this case only the intended area to be sprinkled will most likely be watered, yet there will be a region of overlap concentrated towards the center of the yard. Thus, the area is not evenly irrigated, and edge areas will typically become dry sooner, while the central area may remain quite moist (thus promoting grown of fungus and the like in this area). This situation is depicted in FIG. 1A, which shows a plan view of an area A1 which is desired to be watered (or irrigated). In the example depicted in FIG. 1A, the area A1 to be watered is bounded by border 1, and is depicted as generally being a square area. In this example two sprinkler heads, 10' and 10", are located at opposite corners of the square area A1. Each of the sprinkler heads 10' and 10" are configured to provide spray over an area consisting of a circular arc of 90 degrees. Thus, sprinkler head 10' will cover an area bounded by the upper edge A1-1, the left-most edge A1-2, and the arc 4, while sprinkler head 10" will cover an area bounded by the lower edge A1-3, the right-most edge A1-4, and the arc 5. As can be seen, this will result in an area 3 of overlapping spray, thus providing essentially twice as must water to area 3 as to areas 2. As can be appreciated, this is an undesirable situation, since water is not evenly applied to areas 2 and 3.

Alternately, if a sprinkler head which sprays in a circular pattern is placed inward of the perimeter of a square lawn area, its circular pattern will miss corner areas, and will typically insufficiently irrigate edge areas. That is, a sprinkler head configured to provide a circular spray pattern will inherently be incapable of sprinkling an area which is not bounded by a circular perimeter. Since most lawns, yards and gardens are non-circular in shape, the common pop-up and rotary sprinkler spray heads cannot water such areas without either (1) spraying beyond the perimeter of the intended area, or (2) depriving parts of the intended area to be watered from receiving the desired quantity of water. This is graphically depicted in FIG. 1B, which shows a plan view of the area A1 (of FIG. 1A) which is desired to be watered (or irrigated). In this instance, a single rotary sprinkler head 10 is centrally located in the essentially square area A1 which is to be sprinkled. As can be seen, a water flow from sprinkler 10 which covers the entire area A1 (bounded by circle 7) also includes overspray of areas 9, which can result in (1) waste of water, and (2) undesirable application of water to features (such as housing siding and the like) located in areas 9. On the other hand, a water flow from sprinkler 10 which does not provide overspray into areas 9 will be bounded by circle 6, but will not provide water to corner areas 8.

The problem depicted in FIGS. 1A and 1B becomes more acute when the area to be sprinkled is of a complex geometry. FIG. 1C is a plan view of an area A2 to be sprinkled which includes a number of different geometric shapes (e.g., concave edges, convex edges, straight edges, and non-parallel edges). The area A2 to be sprinkled is defined by a perimeter line "PL2" (which is not necessarily straight, curved, and/or continuous). A prior-art solution to the problem of watering the area A2 of FIG. 1C is depicted in FIG. 1D. In FIG. 1D, four separate sprinkler placements (10A, 10B, 10C and 10D) are provided to generally cover the area A2. (The four separate sprinkler placements can either be provided by a fixed in-ground sprinkler system, or by systematically placing a single sprinkler in each of the four indicate positions). In the example of FIG. 1D, sprinkler heads 10A and 10C are rotating sprinkler heads, configured to sprinkle over areas bounded by perimeters 20 (in the case of sprinkler 10A), and 24 (in the case of sprinkler 10C). Also in the example of FIG. 1D, sprinkler heads 10B and 10B are rotating sprinkler heads (or, alternately, pop-up circular spray pattern sprinkler heads) bounded by respective perimeters 22 (for sprinkler head 10B) and 26 (for sprinkler head 10D). As can be seen from FIG. 1D, the proposed pattern of sprinkler head placement (for sprinkler heads 10A, 10B, 10C and 10D) provides overspray (i.e., irrigation to non-desired areas) in areas 28, overlapping watering in other areas (30), and no watering to area 32. Further, as can be appreciated from FIG. 1D, the proposed watering arrangement requires either the placement of four separate in-ground sprinkler heads (10A, 10B, 10C and 10D), or four separate placements by a user of a single sprinkler head over a period of time to achieve the indicated coverage. In the first instance (i.e., placement of four separate in-ground sprinkler heads), this increases cost and complexity of an in-ground sprinkler system. In the second instance (i.e., four separate placements of a single sprinkler by a user over a period of time), this requires increased user involvement, which may be undesirable to the user.

Some proposed solutions to this problem are known in the prior art. For example, U.S. Pat. No. 1,796,942 describes a rotating sprinkler head which can vary the distance from the sprinkler head to the outer reach of the spray pattern by adjusting the angle of declination of the sprinkler head. This is done by using fixed cams which cause the sprinkler head to selectively move angularly up-and-down through the cycle of rotation. As is apparent, a separate cam is required for each spray area. That is, the sprinkler head is not "programmable" other than by replacing one cam with another.

Another proposed prior art solution to the problem described above can be found in U.S. Pat. No. 3,528,093. The '093 patent describes a rotating sprinkler head which can vary the distance from the sprinkler head to the outer reach of the spray pattern by adjusting the volumetric flow of water to the sprinkler head. This is accomplished by using a cam which throttles flow as a function of position of the sprinkler head through the cycle of rotation. As with the device described in the '942 patent, a separate cam is required for each spray area.

DETAILED DESCRIPTION

Figure 1A:
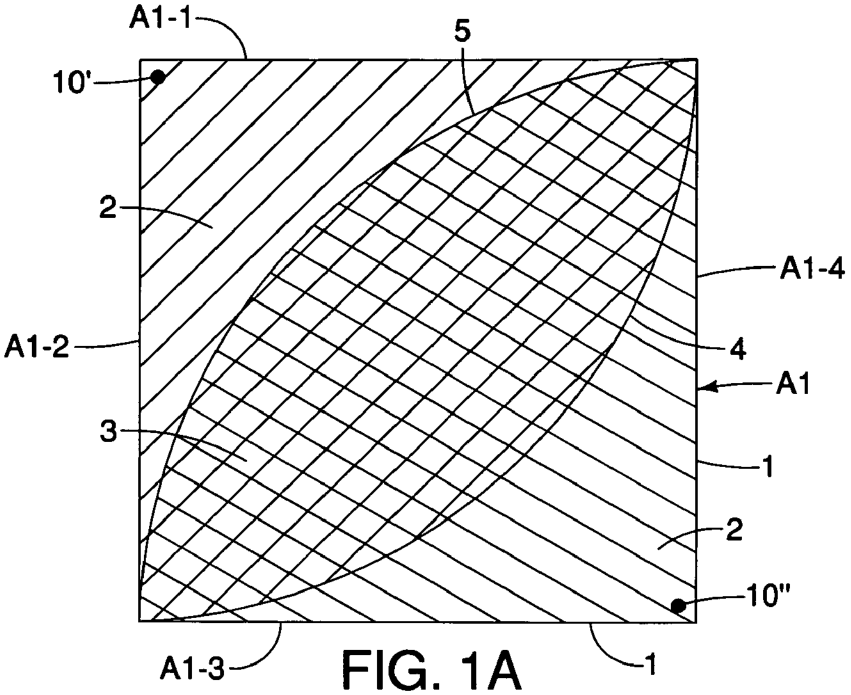
FIG. 1A Prior Art
FIG. 1A is a plan view of a desired area to be irrigated (sprinkled), and depicting a first prior-art solution to irrigating the desired area.
Figure 1B:
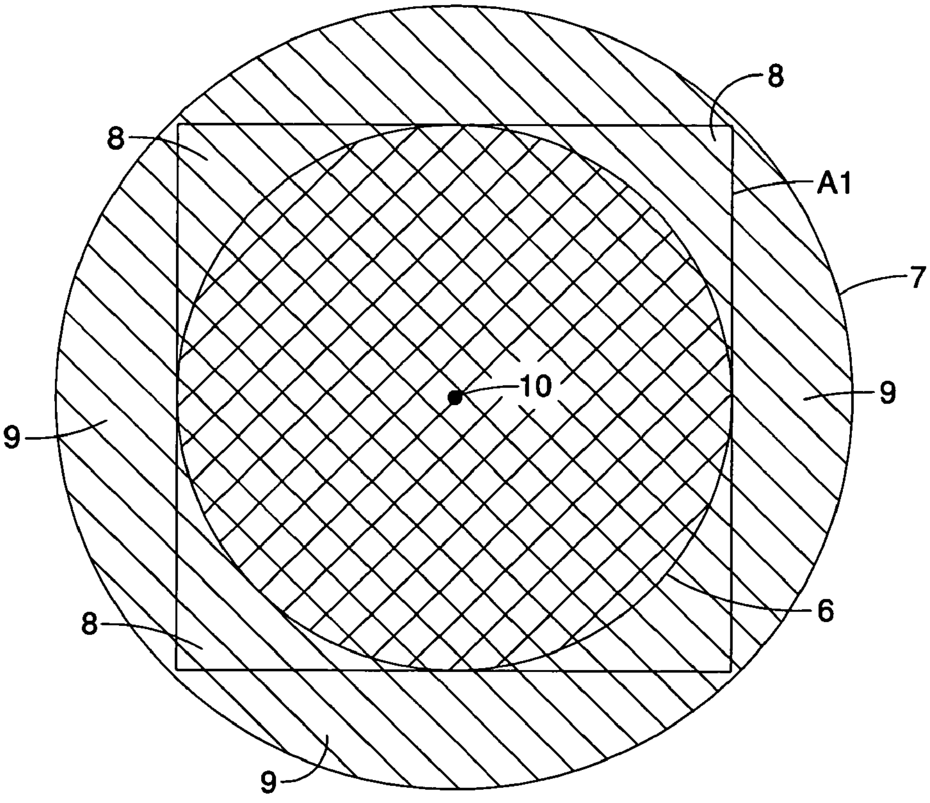
FIG. 1B Prior Art
FIG. 1B is a plan view of a desired area to be irrigated (sprinkled), and depicting a second prior-art solution to irrigating the desired area.
Figure 1C:
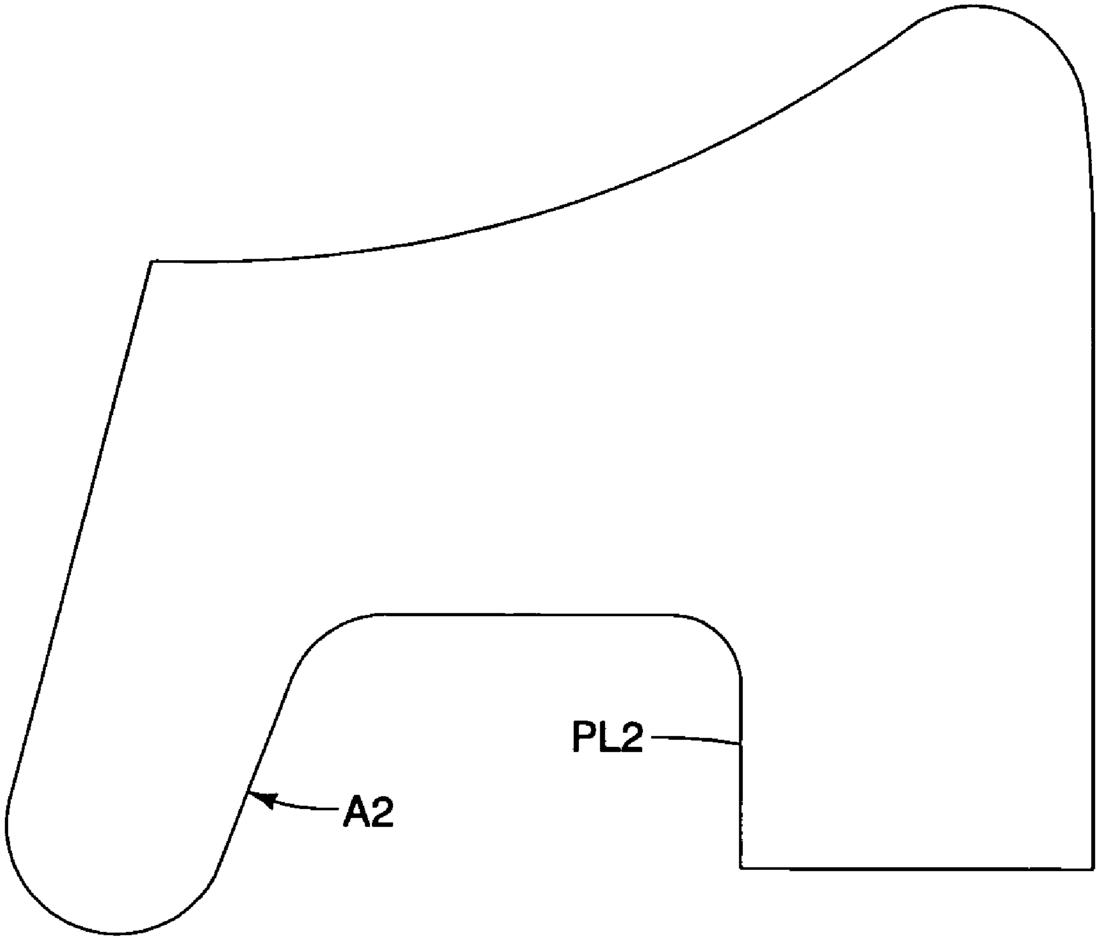
FIG. 1C is a plan view of a complex geometry desired area to be irrigated (sprinkled).
Figure 1D:
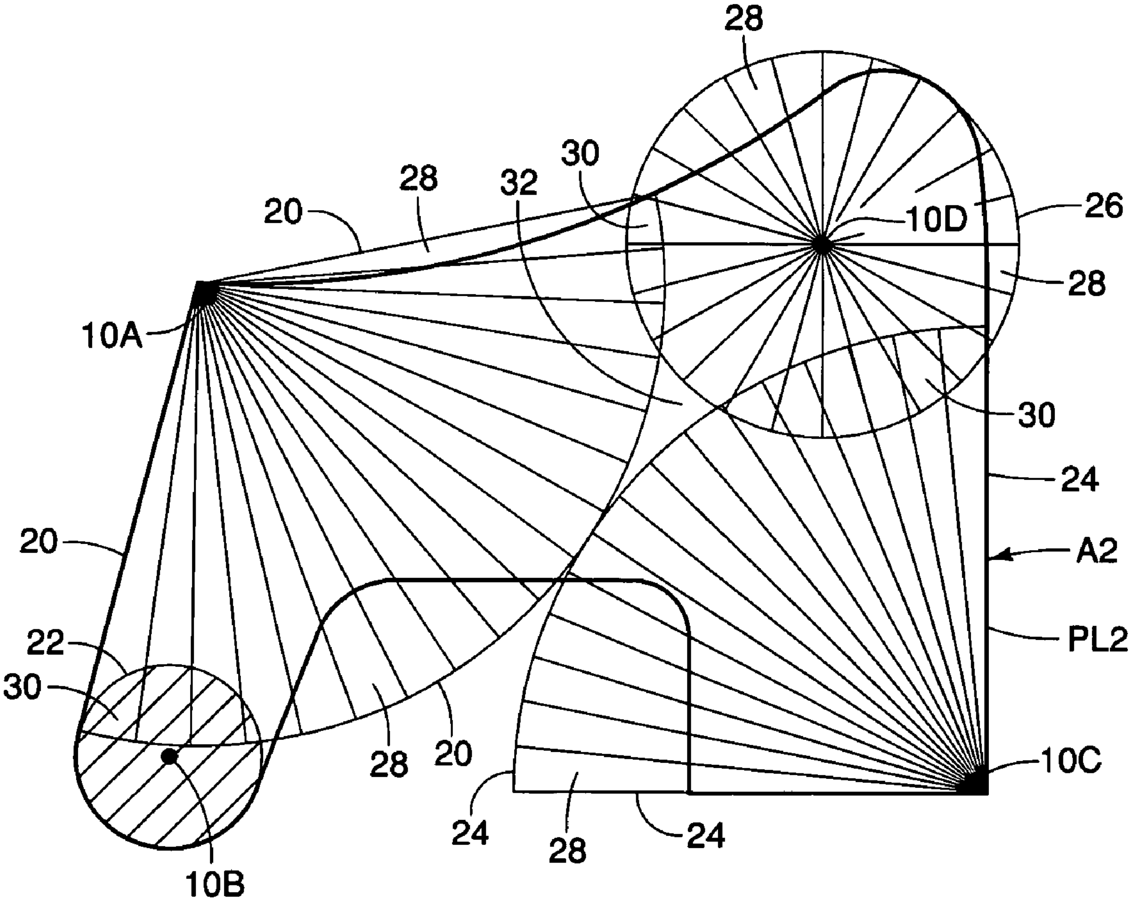
FIG. 1D Prior Art
FIG. 1D is a plan view depicting one possible prior art solution to irrigating the complex geometry area depicted in FIG. 1C.
Figure 2:
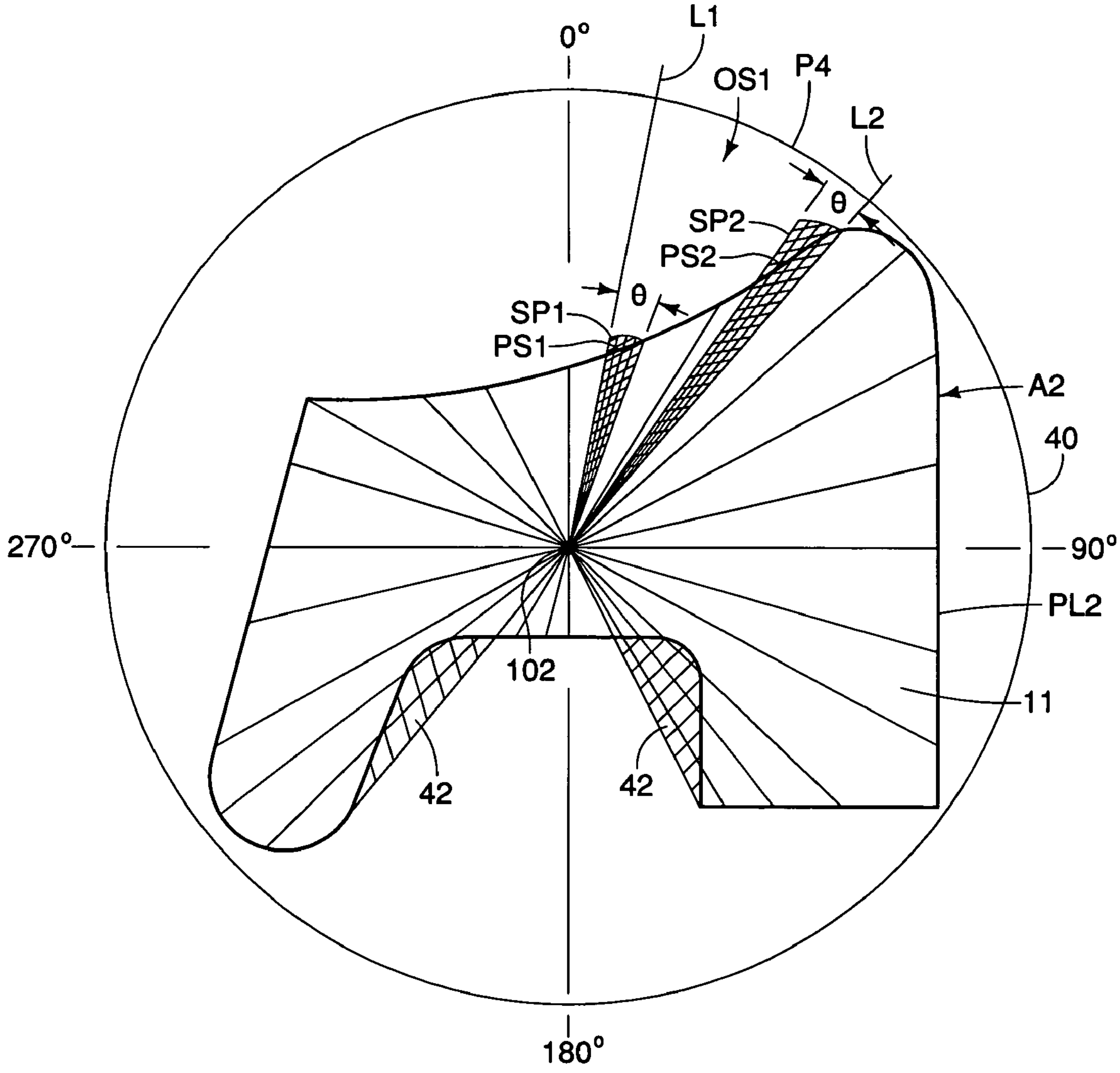
FIG. 2 is a plan view depicting how a sprinkler apparatus of the current disclosure can be used to irrigate the complex geometry area depicted in FIG. 1C.

The apparatus disclosed and described herein provides for an area-programmable sprinkler and sprinkler system which can provide irrigation (i.e., water spray or watering) to a desired area to be sprinkled, while substantially reducing overspray (i.e., watering to areas which are not desired to be watered), and also substantially reducing overlapping watering in areas within the desired area to be sprinkled, and particularly as compared to the prior art. One example of a application of an area-programmable sprinkler in accordance with the present disclosure is depicted in FIG. 2, which is a plan view of the desired area to be sprinkled A2 of FIGS. 1C and 1D. In FIG. 2, a sprinkler head 102 in accordance with the present disclosure is located within the area to be sprinkled A2. The area-programmable sprinkler of the present disclosure (which includes sprinkler head 102) can be programmed to provide irrigation to area 11 (as depicted by the radial lines extending outward from sprinkler head 102). The sprinkler head 102 is configured to provide irrigation to a circular area bounded by circular perimeter 40, but can be programmed (via the other system components described hereinafter) to only provide irrigation to the area A2, save for the minor overspray in areas 42. As can be appreciated by a comparison of FIGS. 1D and 2, the area programmable sprinkler (and sprinkler system) of the present disclosure (as depicted in FIG. 2) substantially reduces the amount of overspray (areas 28, FIG. 1D), and the non-irrigated portion (32, FIG. 1D) over the prior art (FIG. 1D). As can further be appreciated by a comparison of FIGS. 1D and 2, the area programmable sprinkler (and sprinkler system) of the present disclosure (as depicted in-use in FIG. 2) substantially reduces the number of fixed sprinkler heads and/or sprinkler head placements (from the four positions 10A, 10B, 10C and 10D in FIG. 1D, to the single position 102 in FIG. 2) required to irrigate the area the be watered (A2).

As will be evident from the following disclosure, the area programmable sprinkler (and sprinkler system) of the present disclosure provides advantages over the prior art. Specifically, with respect to the apparatus disclosed in U.S. Pat. No. 1,796,942 (which provides for a rotating sprinkler head which can vary the distance from the sprinkler head to the outer reach of the spray pattern by adjusting the angle of declination of the sprinkler head), this prior art solution maintains constant volumetric water flow over the entire area to be sprinkled. Thus, areas which are bounded by the then-current distance between the sprinkler head and the perimeter of the area to be sprinkled will receive differential amounts of water (on a gallon-per-square-foot basis), and thus the area to be sprinkled will not be evenly irrigated. By contrast, the apparatus of the present disclosure provides for an irrigation system which can provide an essentially constant flow of water (on a gallon-per-square-foot basis) to the area to be sprinkled.

Further, with respect to the apparatus disclosed in U.S. Pat. No. 3,528,093 (which provides for a rotating sprinkler head which can vary the distance from the sprinkler head to the outer reach of the spray pattern by adjusting the volumetric flow of the sprinkler head by way of a cam which throttles flow as a function of position of the sprinkler head), the apparatus of the present disclosure provides for an irrigation system which can be programmed for several different areas to be sprinkled, without the use of providing separate cams for each different area. Additionally, since the apparatus described in U.S. Pat. No. 3,528,093 uses "water jet pressure" to advance the sprinkler head in a rotating pattern, this "water jet pressure" will vary as the water flow from the spray nozzle is varied (by the cam), and the rate of rotation of the sprinkler head will thus not be constant, and the sprinkler head will thus provide an uneven rate of water application (in gallons per square foot) to the area to be sprinkled, similar to the deficiency described above for the apparatus described in U.S. Pat. No. 1,796,942.

A further advantage of a sprinkler system in accordance with the present disclosure over the prior art (specifically, the devices described in U.S. Pat. Nos. 1,796,942 and 3,528,093) is the ease of use of the apparatus described herein. Specifically, in order to adjust the cams for the devices described in U.S. Pat. Nos. 1,796,942 and 3,528,093 the user must individually adjust each cam positioner in order to provide coverage over the area to be sprinkled. This can require making multiple adjustments to the cam positioners, turning the sprinkler off and on following each adjustment. (Alternately, the user can replace one cam with another for different areas, but this necessitates having a plurality of cams available.) Further, in these prior art devices once a cam is established to provide coverage to an area to be sprinkled, if the sprinkler is moved to a different location (even within the area to be sprinkled), then the cam must either be reconfigured to adjust to the new location of the sprinkler head, or replaced with a different cam. As can be seen, these prior art devices can involve significant user interaction in order to achieve area-variable irrigation. By contrast, the area-programmable sprinkler system of the present disclosure enables a user to easily adjust a water flow pattern over the area to be sprinkled. Further, this adjustment of the water flow pattern can be performed without the need for the user to enter the area to be sprinkled during the adjustment process, thus allowing the user to avoid stepping in wet lawn during the adjustment process.

Additional advantages of the apparatus and system of the current disclosure over the prior art will become evident in the following disclosure.

The following disclosure provides for at least the three following embodiments: (1) a single sprinkler head which can be used to provide a programmable watering to one or more areas to be sprinkled; (2) a sprinkler system (such as an in-ground sprinkler system) which comprises multiple sprinkler heads in order to provide programmable watering to one or more areas to be sprinkled; and (3) a sprinkler which incorporates programmable angle-of-declination adjustment for a water discharge nozzle of the sprinkler.

We will now proceed to describe each embodiment, and variants, in detail.

First embodiment: Single sprinkler controllable for area-programmable coverage of area (or areas) to be sprinkled.

The first embodiment generally includes a sprinkler head having a water discharge nozzle and adapted to move between a first sprinkler head position and a second sprinkler head position, to thereby apply water to the area desired to be sprinkled. In the following descriptions and figures, the sprinkler head is presumed to move in a rotational pattern about a fixed sprinkler base, discharging water from the discharge nozzle in a relatively narrow arc over the area to be sprinkled as the sprinkler head rotates. (The arc of discharge of water from the discharge nozzle is typically in the range of between about 2 degrees and about 20 degrees.) However, as will be appreciated from the following description, the general concepts provided for herein can equally be applied to other sprinkler types, such as a travelling sprinkler (which physically moves a sprinkler base from a first location to a second location within the area to be watered during use of the sprinkler), and an oscillating (i.e., "back-and-forth") sprinkler. Further, in the case of the sprinkler head moving in a rotational pattern about a fixed sprinkler base (which supports the sprinkler head), the first sprinkler head position and the second sprinkler head position generally describe a circular arc (which can include a full circle) over which the sprinkler head is intended to travel.

Referring to FIG. 2 (described above), the sprinkler head discharge nozzle (not specifically identified, but presumed to be fixed with respect to the rotating sprinkler head 102) distributes water spray in an arc covered by "θ" degrees (here, about 4-7 degrees). In a first spray position "SP1" the discharge nozzle discharges water over the indicated area which is bounded by perimeter segment "PS1", and in a second spray position "SP2" the discharge nozzle discharges water over the indicated area which is bounded by perimeter segment "PS2". As can be seen, a certain amount of overspray of the area to be watered (A2) is provided in each of the two spray positions (SP1 and SP2). However, it will be appreciated that this overspray is insignificant as compared to the overspray OS1 (i.e., the circular arc bounded by lines L1 and L2, arc-line P4, and the sprinkler head 102) which would be experienced in a traditional prior art situation where the spray from sprinkler head 102 was not area-programmable. (The present disclosure also provides for methods to reduce the overspray which can result from implementation of the area-programmable sprinklers described herein.)

The sprinkler system of the first embodiment further includes a sprinkler head positioner. The sprinkler head positioner moves (either directly or indirectly) the sprinkler head between the first and second sprinkler head positions. For purposes of the examples described herein below, and particularly with respect to the exemplary figures, the sprinkler head positioner moves the sprinkler head in a rotational motion about a static sprinkler base (which supports the sprinkler head). Thus, for purposes of these examples, the sprinkler head positioner rotates the sprinkler head in a circular arc about the sprinkler base (as viewed in a plan view). However, it will be appreciated that for other types of sprinkler heads (e.g., a traveling sprinkler head or an oscillating sprinkler head), the sprinkler head positioner can move the sprinkler head along a trajectory within (or proximate to) the area to be sprinkled (in the case of the traveling sprinkler head), or back-and-forth within (or proximate to) the area to be sprinkled (in the case of the oscillating sprinkler head). The sprinkler head positioner can be driven by sources such as electrical power or flow of water to the sprinkler head.

The sprinkler system of this first embodiment further includes a sprinkler head position determiner to determine a current sprinkler head position between the first and second sprinkler head positions. That is, assuming that the water discharge nozzle is fixed with respect to the sprinkler head, and the sprinkler head (and thus, the discharge nozzle) move rotationally about the fixed sprinkler base, the sprinkler head position determiner determines the relative position of the sprinkler head (and thus, the discharge nozzle) with respect to the fixed sprinkler base. The sprinkler head position determiner serves to establish (or determine) the position of the sprinkler head (and thus, the position of the water discharge nozzle) relative to a segment of the perimeter line (e.g., perimeter segment PS1 of perimeter line PL2 of FIG. 2) which can be covered by discharge of water from the water discharge nozzle. The sprinkler head position (based on information derived from the sprinkler head position determiner) is generally used to determine a desired flow of water from the discharge nozzle relative to the then-current position of the sprinkler head. In general, the sprinkler head position determiner produces a position signal representative of the then-current position of the water discharge nozzle relative to the sprinkler base. As will be described below, this nozzle position signal can be used to determine the flow of water to be sent to the discharge nozzle for the then-current sprinkler head position.

For purposes of the examples described herein below, and particularly with respect to the exemplary figures, the sprinkler head position determiner establishes the relative rotational position of a rotating sprinkler (and thus the water discharge nozzle) head about a static sprinkler base (which supports the sprinkler head). However, it will be appreciated that for other types of sprinkler heads (e.g., a traveling sprinkler head, and an oscillating sprinkler head), the sprinkler head position determiner can determine the position of a sprinkler head along a trajectory within (or proximate to) the area to be sprinkled (in the case of the traveling sprinkler head), and a forward and/or backward position of a sprinkler head (in the case of an oscillating sprinkler head).

The sprinkler system of the first embodiment further includes a flow control valve to control flow of water from a main water supply to the water discharge nozzle in the sprinkler head. As described more fully below, the flow control valve (which may also be referred to hereinafter as "FCV") operates in response to signals from a controller to control flow of water from the main water supply to the water discharge nozzle. The flow control valve can be of any known form of a controllable valve, such as a ball valve, a gate valve, a globe valve, or other any other form of valve.

The first embodiment of the sprinkler system provided for herein further includes a flow control valve positioner to establish a current control valve position of the flow control valve between an essentially fully closed control valve position and an essentially fully open control valve position. More particularly, the flow control valve positioner regulates flow of water (via the flow control valve) between the main water supply and the sprinkler head discharge nozzle. The flow control valve positioner thus serves to adjust flow of water emanating from the sprinkler head (e.g., 102, FIG. 2) such that water flow at least (desirably) reaches the then-current perimeter segment (e.g., PS1, FIG. 2), without providing significant spray beyond this perimeter segment, or spray which would not essentially provide water coverage to this segment.

The sprinkler system of the first embodiment also includes a controller to receive a sprinkler head position signal from the sprinkler head position determiner, and to send a control valve control signal to the flow control valve positioner in response thereto. That is, in order to determine the correct flow to be sent to the sprinkler head (as determined by the control valve), the position of the flow control valve positioner is set based on the then-current direction of the sprinkler head discharge nozzle, as determined by the sprinkler head position signal sent from the sprinkler head position determiner. More particularly, the controller receives the sprinkler head position signal (or a derivative signal based thereon), and, based on this signal, generates a control valve position signal to be sent to the control valve positioner. Exemplary forms for the controller include a microprocessor, a programmable logic circuit (or "PLC"), an analog control circuit, and electronic components (e.g., transistors, resistors, diodes, etc.) on a circuit board.

Figure 3:
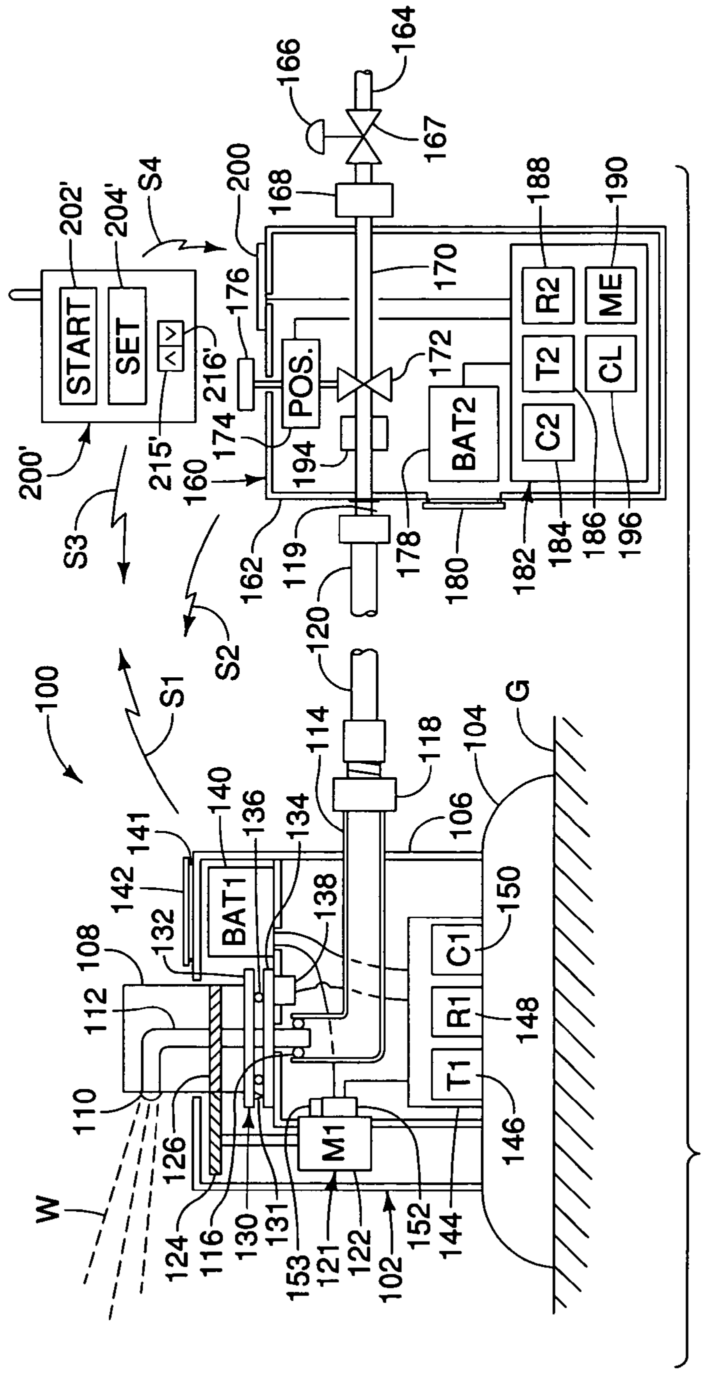
FIG. 3 is a side view schematic diagram depicting a first embodiment of an area-programmable sprinkler system in accordance with the current disclosure.

FIG. 3 is a generally side elevation view depicting one example of a sprinkler system in 100 accordance with the first embodiment. The sprinkler system 100 includes a sprinkler 102 and a control unit 160, which are connected by a water conduit (here, a garden hose) 120. The sprinkler 102 includes a sprinkler head 108 and a sprinkler base 104. The sprinkler base 104 supports the sprinkler 102 on a ground or surface "G" which is within, or proximate to, an area to be watered. The sprinkler base 104 also supports the sprinkler head 108 so that the sprinkler head can rotate about the base (i.e., in a plan view, sprinkler head 108 rotates clockwise and/or counter-clockwise relative to base 104). Sprinkler 102 is provided with a housing 106 which encloses other components of the sprinkler (described below) to provide protection for those components.

Sprinkler head 102 includes a water discharge nozzle 110 which projects water "W" in a relatively narrow spray angle (between approx. 2 degrees and approx. 20 degrees in this example) from the sprinkler head. Water is provided to the discharge nozzle 110 by a sprinkler head conduit 112 which fluidically connects to a sprinkler water line 114. A rotational seal 116 allows the sprinkler head conduit 112 to move rotationally with respect to the static sprinkler water line 114. The sprinkler 102 further includes a hose connector 118 allowing the sprinkler water line 114 to be connected to the garden hose 120. In one variation the water discharge nozzle 110 can be interchangeable so that a user can select from among several different spray patterns. For example, a user may desire to use a first discharge nozzle which produces a larger sized droplet as compared to a second discharge nozzle which produces a smaller sized droplet (at the expense of not being able to project the water spray as far when using the first discharge nozzle).

Sprinkler 102 further includes sprinkler head positioner 121, which serves to cause the sprinkler head 108 to rotate about the sprinkler base 104. In the example depicted, the sprinkler head positioner 121 includes an electric motor 122 which drives drive gear 124. Drive gear 124 in turn engages sprinkler head gear 126, such that motor 122 can cause the sprinkler head 108 to rotate about the sprinkler base 104. In the example depicted, the sprinkler head motor 122 is a rotary motor. However, in an optional configuration the sprinkler head motor 122 can be a linear electric motor which can engage a rack-and-pinion type drive connected to sprinkler head 108. The sprinkler motor 122 can be optionally provided with a motor starter solenoid 152, and can be further optionally provided with a sprinkler motor reversing unit 153. (Sprinkler motor starter solenoid 152, and sprinkler motor reversing unit 153, will be described further below.)

It will be appreciated that the sprinkler head positioner 121 can also be provided as a water motor, which is commonly known in the art. A water motor uses the flow of water from pressurized water supply (e.g., hose 120) in order to drive an impeller, which in turn drives a sprinkler head (e.g., sprinkler head 108) in rotational motion. In the instance of the current disclosure, the use of an electric motor as the sprinkler head positioner can provide certain advantages over the use of a water motor. In the first instance, the use of an electric motor as the sprinkler head positioner generally ensures an essentially constant rate of movement for the sprinkler head (e.g., as measured in degrees of movement per minute), whereas a water motor will provide a variable rate of movement for the sprinkler head. That is, if a water motor is used as the sprinkler head positioner, then as flow of water to the sprinkler discharge nozzle 110 is increased or reduced (in order to provide variable irrigation to the area to be sprinkled), the rotational speed of the sprinkler head 108 will likewise be respectively increased or reduced. This in turn provides for an uneven distribution of water (as measured in gallons per square foot) of the area to be watered. More particularly, a water motor (which is subject to variable flow) will generally provide a constant flow of water to a discharge nozzle, as measured in gallons per minute per degree of arc. However, this does not consider the length of the area to be covered by the arc of the sprinkler spray (i.e., the distance from the sprinkler head to the outer perimeter of the instant area to be watered). By contrast, an electric motor (when used in conjunction with variable water flow to the sprinkler head water discharge nozzle) will maintain a constant rate of the variable flow of water. Put another way, a water motor applies an equal amount of water to a circular arc, regardless of the area circumscribed by the arc, whereas an electric motor provides an equal amount of water to an area circumscribed by a circular arc. As described above, the latter situation (i.e., providing equal amounts of water to different arc segment areas covered by a water sprinkler discharge nozzle) is one of the preferred advantages of the sprinkler systems described herein.

Figure 9:
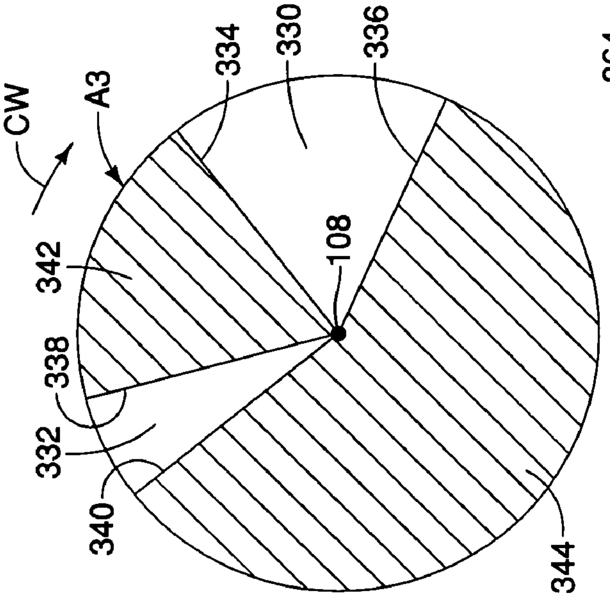
FIG. 9 is a plan view of a general area to be sprinkled depicting how the general area can contain one or more specific areas for which no watering (or sprinkling) is to be provided.

A further advantage of using an electric motor (versus a water motor) as the sprinkler head positioner is that an electric motor can continue to move (i.e., position) the sprinkler head even in the case where there is no water flow. (As can be appreciated, if a water motor is used as the sprinkler head positioner, then in an area where no sprinkling is desired, there will be no water flow, and thus no forward motion of the sprinkler head beyond the area where no sprinkling is desired.) This situation is depicted in FIG. 9, which is a plan view of an area A3 which can be watered by sprinkler head 108. In the situation depicted in FIG. 9, areas 330 and 332 desirably receive no irrigation. Thus, in the instance of no-sprinkle area 330 (and assuming that sprinkler head 108 is generally moving in the clockwise direction "CW"), once the sprinkler head 108 reaches position 334, flow of water to the sprinkler head will cease. Thus, if a water motor is used as the sprinkler head positioner, then the sprinkler head 108 will not move any further, and will stall. However, if the sprinkler head positioner is an electric motor, then sprinkler head 108 will continue to move in direction "CW" to position 336 (regardless of the fact that no water is emanating from the sprinkler head 108), at which time flow of water to the sprinkler head will resume to thus irrigate area 344.

Figure 3A:
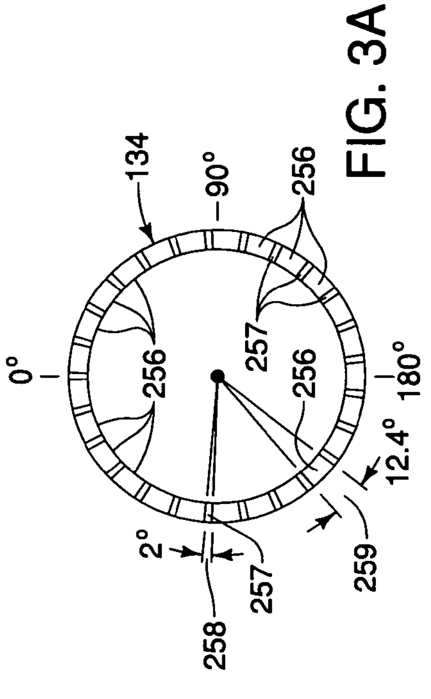
FIG. 3A is a plan view of a rotary encoder base which can be used as part of a sprinkler head position determiner in accordance with the current disclosure.

Returning to FIG. 3, the sprinkler 102 of the current example further includes sprinkler head position determiner 130. As described above, the sprinkler head position determiner 130 serves to indicate the relative position of the moving sprinkler head 108 with respect to the essentially fixed sprinkler base 104. (In the example depicted in FIG. 3, the sprinkler head position determiner 130 serves to indicate a relative rotational position of the moving sprinkler head 108 with respect to the essentially fixed sprinkler base 104.) As depicted in FIG. 3, in this example the sprinkler head position determiner 130 is a rotary encoder which includes a fixed base 134 (i.e., fixed with respect to sprinkler base 104), and a position determiner contact 131 which is supported on a sprinkler head platform 132. Sprinkler head platform 132 rides on static position determiner base 134 supported by a bearing 136. Bearing 136 reduces frictional drag (and thus wear) between the position determiner contact 131 and the position determiner base 134. FIG. 3A is a plan view depicting an exemplary fixed base 134 of the rotary encoder 130. In the example shown, the fixed base 134 includes 25 contact points 256 (which can be electrical contacts) separate by non-conductive spacers 257. As the position determiner contact 131 (FIG. 3) moves over any given contact point 256, the arc segment (e.g., arc segment 259) position for that particular contact (relative to an initial position of 0 degrees, for example) is specifically identified, and thus a then-current position signal can be generated by position sensor 138 (FIG. 3). In the example shown in FIG. 3A, the encoder base includes 25 positions (i.e., 25 separate contact points 256). If the angle of each spacer 257 is 2 degrees (e.g., spacer arc 258), then for a 360 degree circular positioner, 50 degrees of arc will be consumed by the spacers 257, leaving 310 degrees for the contact points 256, or 12.4 degrees per contact point. That is, each contact point 256 can provide for sending a discreet position signal over a 12.4 degree arc. As will be described more fully below, control logic for setting a flow control valve positioner (174, FIG. 3) can include a number of different schemes to provide watering over each discrete segment covered by a position contact point 256 and adjacent spacers 257.

Returning to FIG. 3, the sprinkler 102 can also include a sprinkler electronics package 144. In the example shown, the sprinkler electronics package 144 includes a sprinkler transmitter "T1" (146), a sprinkler receiver "R1" (148), and a local sprinkler control unit "C1" (150). The sprinkler transmitter 146 can be used to transmit sprinkler head position information (from sprinkler head position determiner 130) to the sprinkler controller 182 (described below), as well as other information such as a low battery condition (for battery 140, described below). The sprinkler transmitter 146 can also include a wireless signal transmitter (described below). The sprinkler receiver 148 can receive signal information from the sprinkler controller 182 (such as a signal to start and/or stop motor 122), and can also include a wireless receiver (described below). The local sprinkler control unit 150 can include a clock (not shown), a processor or the like (not shown), and a voltage regulator (also not shown). The local sprinkler control unit 150 can coordinate signals to and from other components in the system 100, as will be described below with respect to FIG. 8.

As depicted in FIG. 3, the sprinkler 102 further includes a power source, shown as battery "BAT1" 140. The sprinkler battery 140 can be protected by sprinkler housing 106, as well as a separate battery compartment (not shown), and can be accessed via battery compartment door 142, which can include a watertight seal 141. The battery 140 can provide electrical power to the sprinkler motor 122, the motor starter solenoid 152, the motor reversing unit solenoid 153, and the sprinkler electronics package 144.

The main control unit 160 of the exemplary sprinkler system 100 of FIG. 3 is depicted as being a separate unit enclosed by a control housing 162, and including a first (or inlet) water connector 168, and a second (or outlet) water connector 119. Control unit water inlet connector 168 can be, for example, a standard female hose connector which can be connected to the male threads of a faucet 167, which is in turn connected to a main water supply source 164. Control unit water outlet connector 119 can be, for example, a standard male hose connector which can be connected to a female connector of garden hose 120, which is in turn connected to the sprinkler 102. (It will be appreciated that in one variation the control unit 160 and the sprinkler 102 can be plumbed in a fixed configuration, thus eliminating certain of the water connectors depicted in FIG. 3.)

The main control unit 160 includes a flow control valve 172 which is placed inline in water supply conduit 170, and which can regulate flow of water from the main water supply 164 to the water discharge nozzle 110 on sprinkler 102. Regulation of the flow control valve 172 is performed by a flow control valve positioner "POS." 174 which can establish a current control valve position for the water restricting component (not shown) within the flow control valve 172. The flow control valve positioner 174 can be provided with a manual positioner 176 which can allow a user to manually adjust the flow control valve positioner 174, and thus manually regulate flow of water from the flow control valve 172. The control valve manual positioner 176 serves as one means for a user to position the flow control valve positioner during a program mode in the control unit 160 (described below). In one variation the flow control valve 172 (and the flow control valve positioner 174) can be located at (or within) the sprinkler 102.

The flow control valve 172 can be implemented using a number of different kinds of valves, however is it desirable (but not essential) that the flow control valve 172 be a fast-acting valve, such as a ball valve (which only needs to move through 90 degrees of rotation to move from a fully closed position to a fully open position), a gate valve, or a globe valve attached to a valve stem having a relatively high-pitch thread pattern. The value of implementing the flow control valve 172 as a fast-acting valve is that during a program mode (described below), the user can use the control valve manual positioner 176 to quickly adjust the flow of water to the sprinkler 102. (That is, use of a standard globe valve, for example, may not allow the user to adjust the flow of water sufficiently rapidly when a quick transition is required between high and low flow situations.)

The flow control valve positioner 174 can be implemented using a number of different kinds of automatic valve positioners, such as an electric rotary motor (including stepper motors) or an electric linear motor. The selection of the particular form of control valve positioner 174 to be used can depend in part on the kind of valve used for the flow control valve 172. As will be appreciated, the valve positioner 174 and the control valve 172 can be linked by a mechanical drive such as a gear rack, a rack-and-pinion drive, and a reduction gear drive.

The control valve manual positioner 176 can be implemented in a number of different forms, and the particular form of implementation will generally (but not necessarily) depend on the kind of flow control valve positioner 174, and/or the form of control valve 172, which is used. In the example depicted in FIG. 3, the control valve manual positioner 176 is implemented as a rotary knob connected to the valve positioner 174, and in this case the valve positioner 174 can be a rotary positioner. In one variation, the manual positioner 176 can be connected directly to the flow control valve 172, or connected through a gear reduction mechanism. In another variation the manual positioner 176 can be a slider. In yet another variation the control valve manual positioner 176 can be implemented as an electronic control on the user interface 200 (described below), in which case there is no physical mechanical connection between the manual positioner 176 and the control valve 172 or the valve positioner 174. In still a further variation (described more fully below), the control valve manual positioner 176 can be eliminated, and its function replaced by using the valve handle 166 on the main water supply faucet 167.

The main control unit 160 also includes a controller electronics package 182, which can include a main controller "C2" (184), a control unit transmitter "T2" (186), a control unit receiver "R2" (188), a memory device "ME" (190), and a clock or timer "CL" (196). The controller 184 can function, and be implemented, as described above in the general description of the first embodiment. The control unit transmitter 186 can transmit signals (and coordinate their transmission) within the overall system 100, and can include a wireless transmitter (not shown). The control unit receiver 188 can receive signals (and coordinate their reception) within the overall system 100, and can include a wireless receiver (not shown). The control unit memory device 190 can be implemented as a computer-readable memory (readable by controller 184, and possibly other components within the system), and can include static memory (ROM) and dynamic memory (RAM). In general, the control unit memory 190 serves to record control valve positioner information correlated with sprinkler head position information. A more detailed description of the functions and interactions of the various components in the controller electronics package 182 will be provided below.

The main control unit 160 of FIG. 3 further includes a main power supply, depicted here as battery "BAT2" (178), which can be accessed in main unit housing 162 via battery compartment door 180. Power supply 178 provides power to the controller electronics package 182, and directly or indirectly to the valve positioner 174 and the user interface 200 (described below). The controller electronics package 182 can include a power regulator and one or more transformers or power converters, and including electrical switching components (none of which are specifically depicted in FIG. 3) in order to regulate one or more of the voltage, amperage, power type (AC or DC), and distribution of power to various other components in the system 100.

Figure 4:
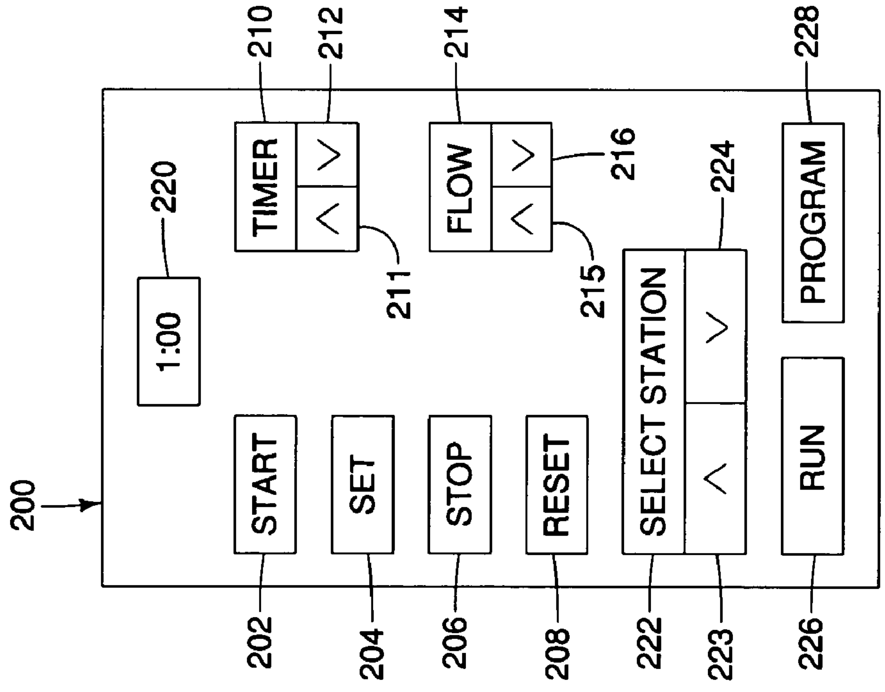
FIG. 4 is a plan view of a user interface which can be used with at least the area-programmable sprinkler system depicted in FIG. 3.

Main control unit 160 includes a user interface 200, here depicted as being mounted on the main unit housing 162. The primary function of the user interface 200 is to enable a user to choose between a program mode (wherein the user programs the controller 184 to provide a desired sprinkling pattern to an area to be watered), and a run mode wherein the controller 184 carries out the program entered by the user. (More on the program and run modes will be provided below.) Accordingly, in the simplest implementation the user interface 200 can be implemented as a switch to allow the user to select between the "program" and "run" modes. However, the user interface 200 can further include a number of enhancements, as depicted in FIG. 4. FIG. 4 is a plan view depicting an exemplary user interface 200 which can be used with the sprinkler system 100 of FIG. 3. The user interface 200 of FIG. 4 includes a "START" feature 202, a "SET" feature 204, a "STOP" feature 206, a "RUN" feature 226, a "PROGRAM" feature 228, and a "RESET" feature 208. Start feature 202 can function to power up the sprinkler control unit 160 and the sprinkler head motor 122, while the stop feature 206 can turn the off the sprinkler system (e.g., power down the control unit 160 and the sprinkler motor 122). The program feature 228 can be used to place the controller (184, FIG. 3) in a "program" mode, while the run feature 226 can function to place the controller in a "run" mode. The set feature 204 can be used to set or store a program into the control unit memory (190, FIG. 3), while the reset feature 208 can clear the control unit memory 190 FIG. 3) so that a new sprinkler program can be entered without conflicting with an existing stored program. The user interface 200 can further include a display device 220 to display useful information to the user. (Display device 220 can be, for example, and LCD display.) It will be appreciated that a number of the features described above can be implemented using fewer controls. For example, the start feature 202 can also place the controller 184 in a program mode, and the set feature 204 can also place the controller in a run mode (thus allowing respective program and run controls 228 and 226 to be eliminated).

In one variation, the manual control valve positioner (176, FIG. 3) can be implemented as a flow control feature "FLOW" (214) on the user interface 200 of FIG. 4, including controls 215 and 216 for respective flow increase and flow decrease. (In this case, the flow control feature 214 sends an electrical signal to the valve positioner 174 either directly or via controller 184.) The user interface 200 can also optionally include a timer feature "TIMER" (210) to enable the user to set the period of time over which a program is to be run, as well as a time-of-day start time. The timer feature 210 can include controls 211 and 212 to allow a user to selectively increase or decrease time quantities, and to move through a menu of start times. Timer feature 210 can also work in conjunction with set feature 204 and display 220 to allow a user to page through a timing program (including days of the week, start times and run-length times) and set a sprinkling regimen for an extended period of time.

In still a further variation, the user interface 200 can include a "SELECT STATION" feature 222 which allows a user to select between one or more stations (i.e., sprinklers and/or sprinkler locations) using controls 223 and 224. For example, in the example depicted in FIG. 3, the sprinkler 102 can be placed in a variety of different sprinkler locations. For each sprinkler location, the user can save the respective sprinkling program (as stored in the memory 190) as a separate station. Then, when the user moves the sprinkler 102 from one location to another, the user does not need to reprogram the sprinkling program but can merely recall an existing sprinkling program from the memory 190 using the select station controls 223 and/or 224. Further, the sprinkler system 100 of FIG. 3 can be implemented using a plurality of sprinklers 102 located at different sprinkler locations. In this case the select station feature 222 can be used to select the particular sprinkler to be used at any given time. (This latter variation is described more specifically below with respect to the second embodiment and FIG. 12.)

Returning to FIG. 3, the sprinkler system 100 can be optionally provided with a water flow detector 194 adapted to determine at least an approximation of water flowing out of control valve 172 (and hence, from the water discharge nozzle 110). The water flow detector 194 can send a water flow signal to the controller 184, and the controller can use the water flow signal to assist in setting the position of the control valve positioner 174. These use of the water flow detector 194 is beneficial in situations where the pressure of water from the main supply 164 may be subject to pressure variation (and thus volumetric water flow—e.g., as measured in gallons per minute). As can be appreciated, if the main supply of water is subject to pressure (and flow) variations as a function of time, then the amount of water flowing through the control valve 172 will also vary over time for any given position of the control valve positioner 174. Thus, during the program mode the controller 184 can record not only the then-current position of the control valve positioner 174, but also the then-current corresponding volumetric flow of water from the control valve 172. Then, in a run mode, if the controller 184 determines that the flow of water from the control valve 172 has varied from the initially recorded flow for a given control valve positioner setting (as a result of reading the flow signal from the flow detector 194), the controller can increase or decrease the then-current position of the control valve positioner 174 to account for any such variances.

An exemplary device which can be used for the water flow detector 194 is an inline impeller (not shown) which is disposed at least partially in the fluid conduit between the outlet of the control valve 172 and the water discharge nozzle 110. In this case the impeller can be fitted with a fixed magnet which is configured to pass proximate to a fixed sensor (such as a magnetic switch) located on or in the fluid conduit proximate the impeller. Thus, each time the fixed magnet passes the fixed sensor, a pulse is generated. The higher the frequency of the pulses, the higher the detected water flow. In one variation, the water flow detector 194 can be a device which approximates water flow by measuring water pressure within the fluid conduit between the outlet of the control valve 172 and the water discharge nozzle 110. Since water flow to the discharge nozzle 110 is a function of the pressure drop between the outlet of the control valve 172 and the water discharge nozzle 110, measuring the pressure at a constant point in this fluid conduit will be representative of the flow passing therethough. While the water flow detector 194 is depicted in FIG. 3 as being located proximate the outlet of the control valve 172, it can be advantageous to locate the flow detector 194 in (or proximate to) the sprinkler water supply conduit 114, or even in the sprinkler head conduit 112. Locating the water flow detector 194 in the sprinkler 102 can reduce variances which may be introduced in the fluid conduit between the outlet of the control valve 172 and the water discharge nozzle 110. For example, if the user replaces the garden hose 120 with a different hose of a greater length, then more pressure drop will be introduced by the longer hose (assuming all other variables are held constant). In this case, measuring pressure proximate to the outlet of the control valve 172 would be less indicative of flow than measuring the flow proximate to the discharge nozzle 110. Similarly, if one of the hose fittings 118 or 119 is leaking water, then measuring flow proximate to the outlet of the control valve 172 will not account for this lost water.

Figure 3B:
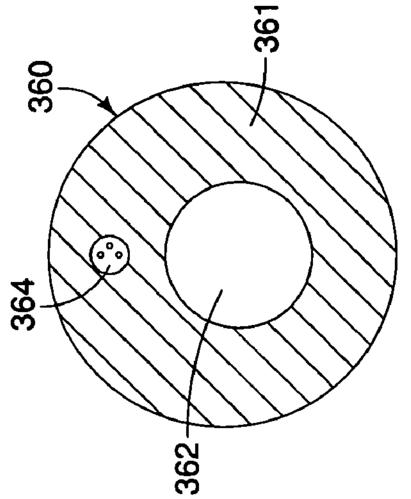
FIG. 3B is a cross section of a fluid conduit which can be used in selected variations of the embodiments described herein.

As described above, in the sprinkler system 100 of FIG. 3 the sprinkler 102 and the main control unit 160 are in signal communication with one another so that at least the then-current sprinkler head position information (as determined by the sprinkler head position determiner 130) can be transmitted to the main control unit 160. This can be accomplished in at least two different ways. Firstly, the sprinkler transmitter 146 and the controller receiver 188 can be connected directly (or indirectly) via a signal wire. This configuration is more practical when the sprinkler 102 is an in-ground sprinkler, and thus the signal wire can be run underground. However, in one variation the signal wire can be integrated into an above-ground conduit (such as a garden hose). An example of such a garden hose is depicted in cross section in FIG. 3B. The garden hose 360 of FIG. 3B is fabricated from rubber (or other elastomeric material) 361, and defines a water conduit 362 and a wire conduit 364. The rubber material 361 prevents water from migrating from the water conduit 362 into the wire conduit 364. The wire conduit 364 can not only house the signal wire from the sprinkler position determiner sensor 138 (FIG. 3), but also electrical power wires (thus eliminating the need for the sprinkler battery 140), as well as other signal wires (e.g., signals from a flow detector sensor). Further, multiple signals can be transmitted on a single signal wire in the wire conduit 364 by multiplexing the signals (e.g., using sprinkler control unit 150). Unlike a traditional garden hose, the garden hose 360 of FIG. 3B can be connected to the main control unit 160 and the sprinkler 102 using a twist-lock fitting (not shown) which places the wires in the wire conduit

364 in electrical contact with electrically conductive terminal contacts (also not shown) in the sprinkler 102 and the main control unit 160. Further, the twist-lock fitting can form a water-tight seal between the water conduit 362 in the hose 120, and the sprinkler water supply inlet fitting 119 (FIG. 3) and the control unit water outlet fitting 119.

In another variation the sprinkler 102 and the main control unit 160 can be placed in signal communication with one another via a wireless system. In this variation the sprinkler transmitter 146 and the control unit transmitter 186 each include a wireless transmitter, and the sprinkler receiver 148 and the control unit receiver 188 each include a wireless receiver. Sprinkler receiver 148 is configured to receive wireless signals S2 transmitted by the control unit transmitter 186, and the control unit receiver 188 is configured to receive wireless signals S1 transmitted by the sprinkler transmitter 146.

In yet a further variation, the sprinkler system 100 of FIG. 3 can be optionally provided with a handheld remote unit 200', as depicted in FIG. 3. The handheld remote unit 200' can receive signals S2 from the control unit 160 and transmit them (as signals S3) to the sprinkler 102, and can also receive signals S1 from the sprinkler 102 and transmit them (as signals S4) to the control unit 160. The handheld remote unit 200' can also include a remote "START" feature 202', a remote "SET" feature 204', and a remote manual flow control adjustment feature (depicted by controls 211' and 212'). These control features (202', 204', 211' and 212') work essentially as per their respective counterpart control features (202, 204, 215 and 216) on the user interface 200 of FIG. 4, described above. The advantage of using the handheld remote 200' is that in the system 100 of FIG. 3 the sprinkler 102 and the main control unit 160 may not always be in line of site of one another. Thus, a user attempting to adjust the flow of water from the sprinkler 102 to an area to be sprinkled may not be able to visually see the area to be sprinkled when the user is at the main control unit 160 (and thus out of site of the area to be sprinkled). Further, if the sprinkler 102 and the main control unit 160 are not in line of site, then the signals S1 and S2 (placing the sprinkler head 102 and the control unit 160 in signal communication) may not be received by receivers 148 and 188. The use of the handled remote unit 200' can thus act as a signal relay station in this case.

While FIG. 3 depicts the main control unit 160 as being separate from the sprinkler 102, in one variation the components within the main control unit (all described above) can be located at or within the sprinkler 102. As may be apparent, such a configuration (i.e., placing the components of main control unit 160 in sprinkler 102) has a drawback that in order to program the controller 184 for the specific area to be sprinkled, the user must be at the sprinkler 102 (unless a handheld remote 200' is used). When the user is physically at the sprinkler 102 during the program mode, the user may be inadvertently sprinkled, or may have to walk in wet lawn, both of which are undesirable from a user standpoint.

Figure 5A:
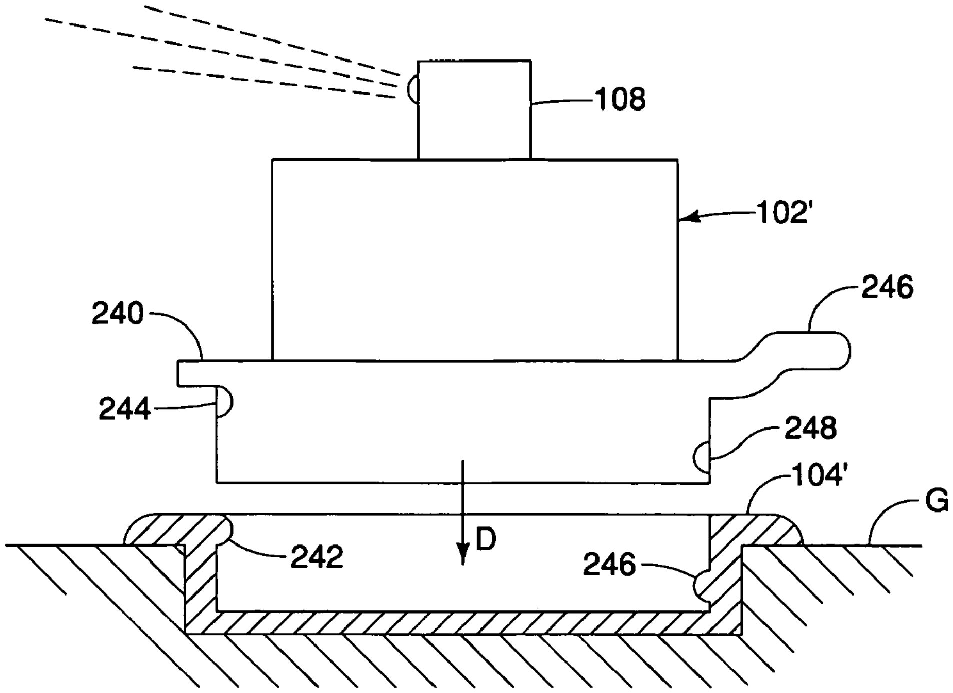
FIG. 5A is a side (partial sectional) view of a sprinkler base mounting system which can be used with a sprinkler head in accordance with the present disclosure.

In FIG. 3 the sprinkler base 104 is depicted as resting on a ground surface "G" which is within or proximate to an area to be sprinkled. When the sprinkler base 104 is freely moveable, then each time the user places the sprinkler 102 on the ground, the sprinkler program will need to be established since the location of the sprinkler within the area to be sprinkled (e.g., sprinkler head 102 in area A2 of FIG. 2) can vary. Further, even if the sprinkler 102 is placed in the same location each time, the orientation of the sprinkler head position determiner 130 may vary (i.e., the user may rotate the sprinkler 102 somewhat, thus providing disorientation between the sprinkler head position determiner 130 and the area to be watered as recorded in a sprinkler program stored in memory 190). In order to address this situation, the sprinkler 102 of FIG. 3 can be provided with an alternative sprinkler base which ensures that the sprinkler 102 is located in the same location, and with the same orientation, within (or proximate to) an area to be sprinkled each time the sprinkler is placed. One example of such an alternative sprinkler base is depicted in a side view in FIG. 5A. The alternative sprinkler base 104' of FIG. 5A is set in the ground "G", and includes a removable sprinkler 102'. The sprinkler base 104' is configured to sit near ground level so that it can be left in place when the sprinkler head 102' is removed, and not present an obstruction to mowing and foot traffic over ground "G". (The sprinkler base 104' can optionally include a spike, not shown, configured to further secure the base into the ground "G".) In this example sprinkler head 102' can include a sprinkler mounting 240 which is received at least partially within the sprinkler base 104' when moved in direction "D". The sprinkler base 104' can include one or more protrusions 242, 246 which are configured to engage counterpart indents 244, 248 in the sprinkler mounting 240. The protrusions 242, 246 and counterpart indents 244, 248 ensure that the sprinkler head 102' is oriented in the same position each time the sprinkler mounting 240 is placed in the base 104'. The sprinkler mounting 240 can also include a handle 246 to assist a user in removing the sprinkler 102' from the base 104'.

Figure 5B:
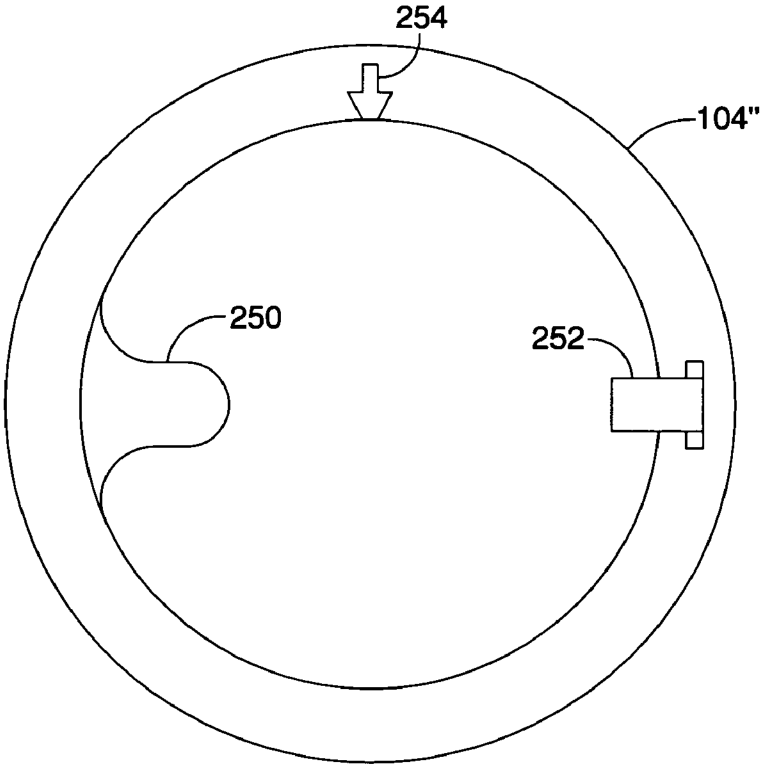
FIG. 5B is a plan view of an optional sprinkler base mount which can be used with a sprinkler head in accordance with the present disclosure.

Another alternative sprinkler base 104" is depicted in plan view in FIG. 5B. In the configuration depicted in FIG. 5B the sprinkler base 104" includes a raised feature 250 in the bottom of the base 104", and in this instance the sprinkler mounting 240 (FIG. 5A) includes a corresponding recess (not shown). The raised feature 250 thus acts as a key for the sprinkler 102'. In order to provide proper orientation of the sprinkler head 102' with respect to the base 104", the user rotates the sprinkler 102' until the raised feature 250 in the sprinkler base 104" fits into the corresponding recessed feature in the sprinkler mounting 240. (It will be appreciated that the locations of the raised feature 250 and the corresponding recess in the mounting 240 can be and reversed between the base 104" and the mounting 240). In the example depicted in FIG. 5B, the sprinkler base 104" can be provided with a releasable locking device 252 to hold the sprinkler 102' in the base 104" during use.

Figure 8:
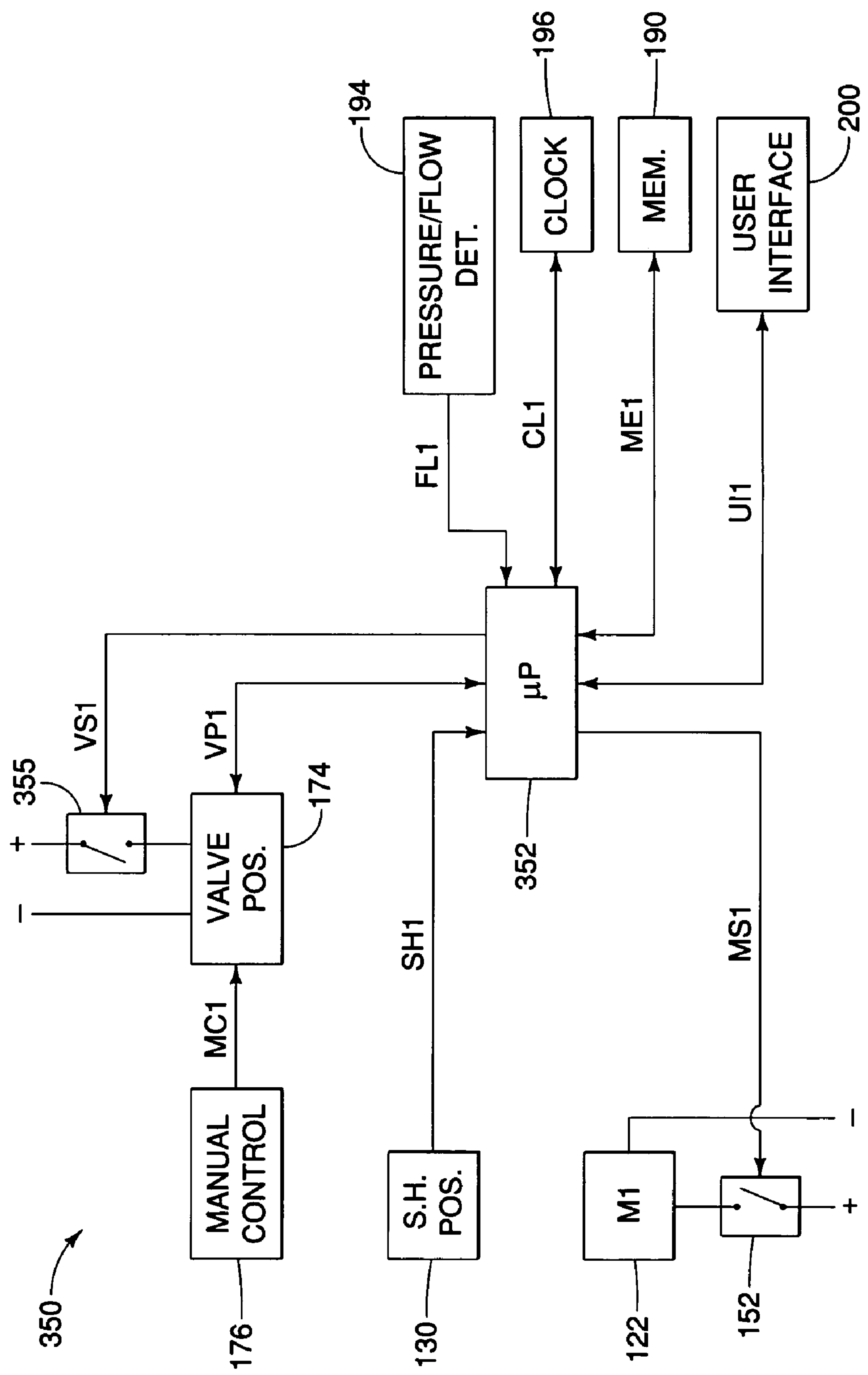
FIG. 8 is a schematic diagram depicting a signal communication schema which can be used for the sprinkler system depicted in FIG. 3.

Turning now to FIG. 8, a schematic diagram depicts one exemplary signal communication schema 350 which can be used for the sprinkler system 100 depicted in FIG. 3. In the example depicted, the sprinkler control unit 150 and the controller 184 of FIG. 3 are depicted as the integrated controller 352 (which is depicted as being a microprocessor). In this example, the following signals can be sent to the controller 352: a sprinkler head position signal SH1 from the sprinkler head position determiner 130; and a flow signal FL1 from the flow detector 194. Further, the following signals can be sent from the controller 352: a sprinkler motor start signal MS1 (to motor starter 152, to send power to sprinkler motor 122); and a control valve positioner start signal VS1 (to the control valve positioner actuator motor, not shown, but located in valve positioner 174). In addition, the following signals can be sent to and from the controller 352: data signals ME1 to be stored in, and read from, memory 190; user instruction signals UI1 from (and user information signals, also UI1 to) the user interface 200; clock signals CL1 from the clock 196 (and, in the case of setting the clock, clock signals CL1 to the clock); and control valve position signals VP1 from the control valve positioner 174 during the program mode, and to the control valve positioner 174 during the run mode. In addition, when the control valve manual positioner 176 is implemented electronically (as for example, using flow feature 214 on user interface 200 of FIG. 4), then the manual positioner 176 can send a manual control valve position signal MC1 to the valve positioner 174. The particular function of each of these signals has been generally described above with respect to their respective component parts, and will now be described further below with respect to exemplary flowcharts describing the operation of the sprinkler system 100 of FIG. 3. In describing the following flowcharts it will be understood that the flowcharts are exemplary only, and that the order of steps can be rearranged, and steps added or removed, all within the spirit of the current disclosure. Accordingly, the flowcharts provided herein are not to be considered as limiting the scope of the current disclosure.

Figure 6A:
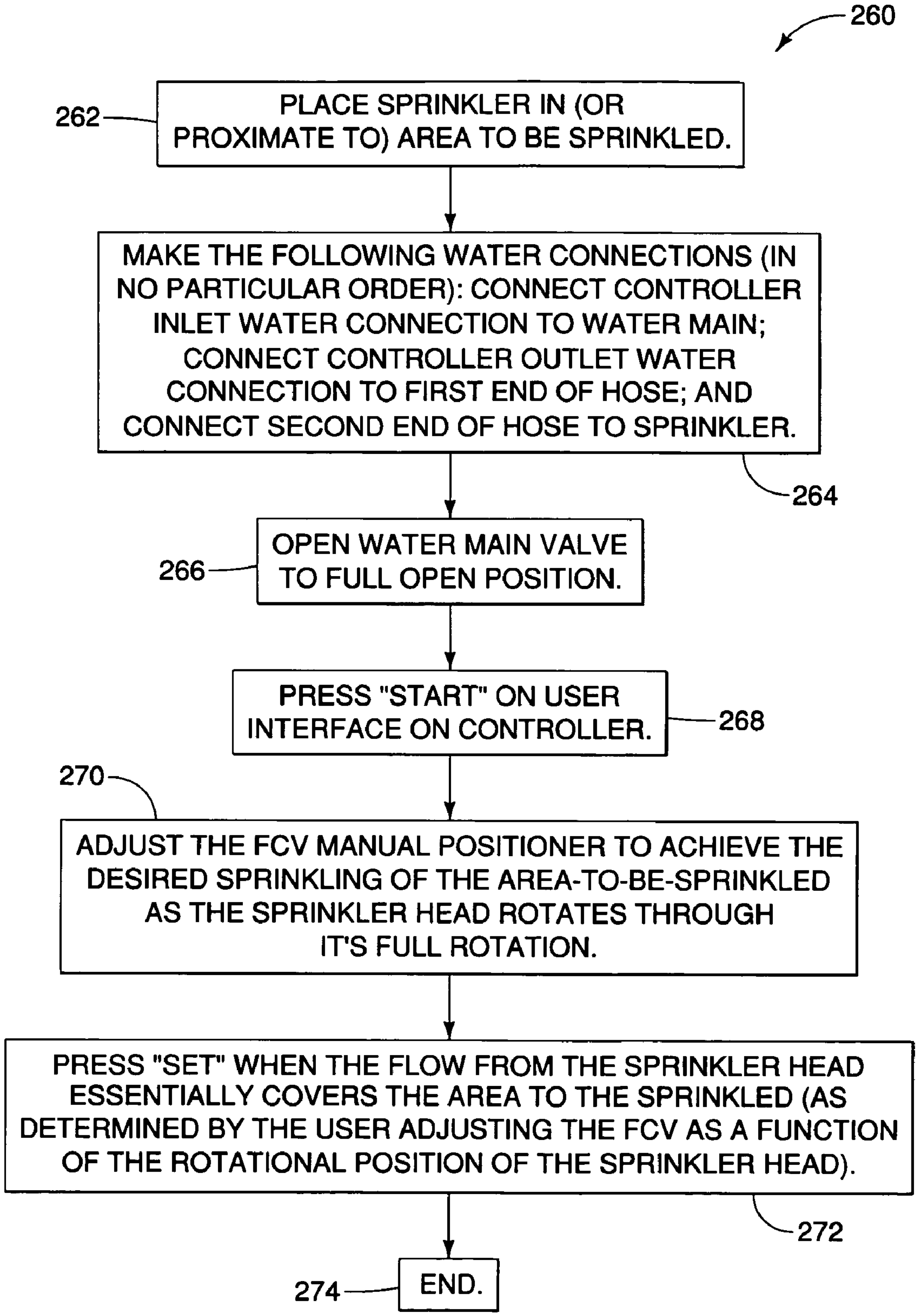
FIG. 6A is a flowchart depicting exemplary user steps for operation of a single sprinkler application of the current disclosure for new position placement of a single sprinkler in accordance with the current disclosure.

With respect to FIG. 6A, a flowchart 260 depicts exemplary user steps for operation of a single sprinkler application of the first embodiment (depicted in FIG. 3) for new position placement of a single sprinkler 102. That is, for the flowchart 260 depicted in FIG. 6A, it is understood that a single sprinkler 102 is in fluid (water flow) and signal communication with the main control unit 160. Thus, the user can place the sprinkler 102 in a new sprinkler location within (or proximate to) an area to be sprinkled, and following each new placement, the steps indicated in flowchart 260 can be performed to program the sprinkler 102 to provide desired irrigation to the area to be sprinkled. Accordingly, the first step 262 is for the user to place the sprinkler 102 (FIG. 3) in (or proximate to) an area to be sprinkled (e.g., area A2 of FIG. 2). In step 264 the user makes the following water connections: controller water inlet connection 168 (FIG. 3) to water main 164; controller water outlet connection 119 to first end of hose 120; and sprinkler water inlet connection 118 to second end of hose 120. The sprinkler 102 and main control unit 160 are now in fluidic communication with one another. In step 266 the user opens the water supply main valve 167 (FIG. 3) to the full open position. In step 268 the user engages the "START" (or "PROGRAM") command on the user interface 200 (respectively, either control 202 or 228 in FIG. 4, or control 202' on the handheld remote 200' of FIG. 3). (Engaging the "start" or "program" command in step 268 places the sprinkler controller 184 (FIG. 3) in a recording or program mode, as will be describe below with respect to FIG. 6B.) In step 270 the user adjusts the flow control valve manual positioner to achieve the desired sprinkling of the area to be watered as the sprinkler head 108 rotates through its full rotation. Adjustment of the flow control valve manual positioner can be performed using either the manual positioner 176 of FIG. 3, via the electronic controls 215 and 216 in the user interface 200 of FIG. 4, or via the control buttons 215' and 216' on the handheld remote 200' of FIG. 3. Once the sprinkler 102 is satisfactorily sprinkling the area to be watered (as determined by the user), then in step 272 the user can enable the "SET" command (204, FIG. 4, or 204', FIG. 3) to set the program (i.e., to store the sprinkler program for the area to be sprinkled into memory 190, FIG. 3). At this point the process ends at step 274, and the sprinkler delivers the desired sprinkling to the area to be watered until the user either closes the main supply valve (164, FIG. 3), engages the "STOP" command (206 on the user interface 200 (FIG. 4), or the sprinkling is performed for a predetermined period of time (as can be established using the timer feature 210 on the user interface 200 of FIG. 4).

Figure 6B:
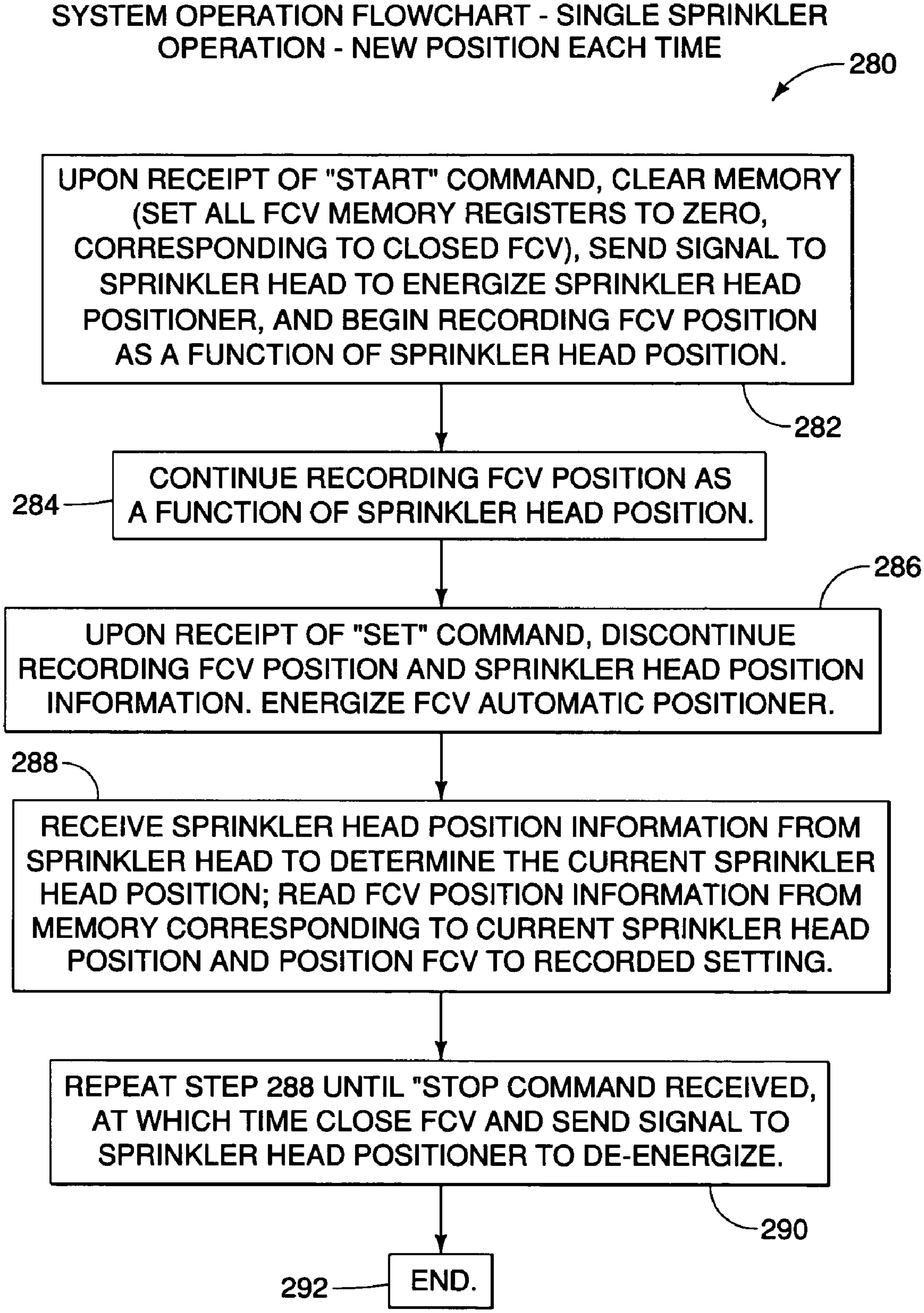
FIG. 6B is a flowchart depicting exemplary system operation steps for a single sprinkler application of the current disclosure for new position placement of a single sprinkler in accordance with the current disclosure, and in general accordance with the user steps depicted in FIG. 6A.

With respect to FIG. 6B, a flowchart 280 depicts exemplary system control steps for operation of a single sprinkler application of the first embodiment (depicted in FIG. 3) for new position placement of a single sprinkler 102, following the exemplary situation described above for the user steps depicted in the flowchart 260 of FIG. 6A. In the flowchart 280 of FIG. 6B, in the first indicated step 282, upon receipt of the "Start" command (e.g., from START control feature 202 of user interface 200 of FIG. 4, via a user interface control signal UI1 in FIG. 8), the controller memory 190 (FIG. 3) is cleared, and all flow control valve memory registers are set to zero (corresponding to a fully closed position of flow control valve 172, FIG. 3). The "Start" command further causes the controller 184 (FIG. 3) to send a motor start signal "MS1 (FIG. 8) to the motor starter relay 152 (FIGS. 3 and 8) to energize the sprinkler head positioner (sprinkler motor 122, FIGS. 3 and 8). The "Start" command can also cause the controller 184 to begin recording (in memory 190, FIG. 3) the then-current position of the flow control valve positioner (174, FIG. 3, and as indicated by valve position signal VP1, FIG. 8) as a function of the then-current sprinkler head position (as determined by the then-current sprinkler head position signal generated by the sprinkler head position determiner 130, FIG. 3, and sprinkler head position signal SH1 of FIG. 8). In step 284 of the flowchart 270 (FIG. 6B), the controller 184 (FIG. 3) continues to record (in memory 190) the flow control valve positioner position data as a function of the sprinkler head then-current position, as the user adjusts the flow via the control valve manual positioner 176 (FIG. 3), and as the sprinkler head 108 rotates through its full sweep. Step 284 is essentially the main sprinkler programming step, wherein then-current water flow data (as generally determined by the user-set position of the flow control valve positioner 174) is recorded in memory 190 along with correlated then-current sprinkler head position data (as determined by the sprinkler head position determiner 130). During the primary program recording step 284 of flowchart 280, then-current water flow data (via water flow signal FL1, FIG. 8) from optional water flow detector 194 (FIG. 3) can also be stored in the memory 190, along with the corresponding then-current control valve positioner data and the then-current sprinkler head position data. Once the user is satisfied with the sprinkler programming and has enabled the "SET" commend (at step 272 in flowchart 260 of FIG. 6B), then in step 286 of flowchart 280 (FIG. 6B) the controller 184 (FIG. 3) discontinues recording the then-current control valve positioner data and the then-current sprinkler head position data. (For any sprinkler head positions for which corresponding control valve position data has not been recorded, the default values for the flow control valve positioner can be set at zero, corresponding to a closed position for the flow control valve 172.) Further in step 286, the "SET" command can cause the sprinkler controller 184 to then automatically enter a "run-program" (or "run") mode. In this instance the controller 184 sends a valve positioner start signal VS1 (FIG. 8) to the control valve positioner solenoid 355 (FIG. 8) to engage the control valve positioner actuator (motor). That is, prior to this time, and during the program recording mode (step 284), the control valve positioner actuator (not specifically shown, but part of the control valve positioner 174) can be de-energized via solenoid 355 in order to avoid conflicts which might arise between an energized actuator and the manual positioner 174.

In step 288 of the flowchart 280 (FIG. 6B), the system controller 184 enters the run mode (in order to run the program recorded at step 284). Specifically, in step 288 the controller 184 (FIG. 3) receives the then-current sprinkler head position information from the sprinkler head position determiner 130 (as signal SH1, FIG. 8) to determine the then-current sprinkler head position, and reads the corresponding flow control valve position information from memory (190, FIG. 3) corresponding to that then-current sprinkler head position. The controller 184 then adjusts the flow control valve positioner 174 (via signal VP1, FIG. 8) in order to achieve the desired flow corresponding to the then-current sprinkler head position. Also at step 288, if initial corresponding water flow data has been recorded from the flow detector 194 (FIGS. 3 and 8) during the program recording step 284 (as describe above), then this flow data can be used to correct the flow valve positioner signal VP1 (based on a then-current flow data signal FL1 received from the flow detector sensor 194) in order to achieve the water flow recorded during the program step 284.

In step 290 of the flowchart 280 (FIG. 6B) step 288 (i.e., the run mode) is repeated until either a "stop" command is received, the main water supply valve is closed, or a timer setting is exhausted (as described above with respect to user step 274 of flowchart 260 in FIG. 6A). At this point the flow control valve 172 is automatically closed (using control valve positioner 174), and a motor signal MS1 is sent to the sprinkler motor solenoid 152 (FIGS. 3 and 8) to de-energize the sprinkler motor 122. Also at this time, a signal VS1 (FIG. 8) can be sent to the control valve positioner 174 (FIG. 3) to de-energize the control valve positioner actuator. The control process is then terminated at step 292.

Figure 7A:
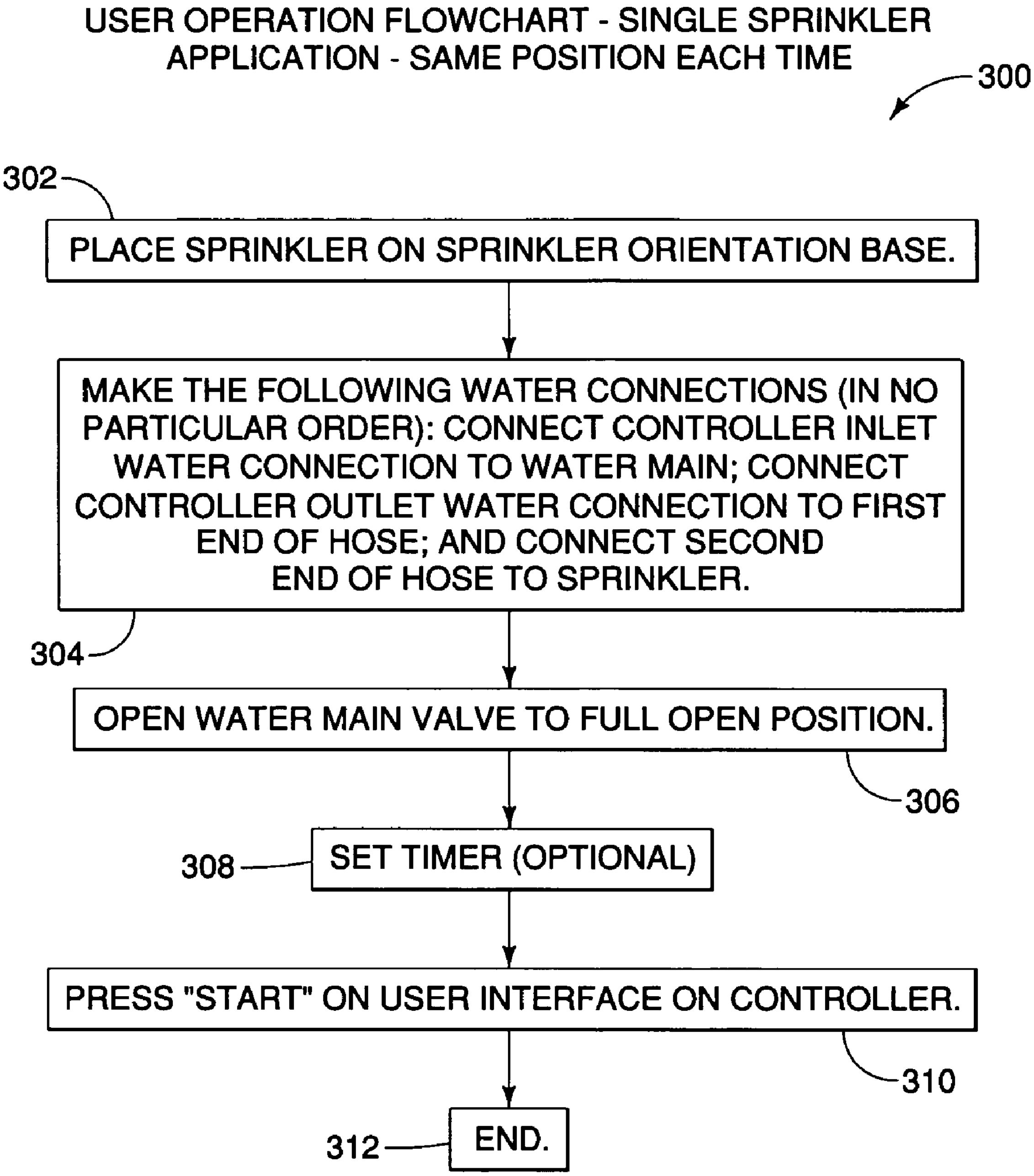
FIG. 7A is a flowchart depicting exemplary user steps for operation of a single sprinkler application of the current disclosure for same-position placement of a single sprinkler in accordance with the current disclosure.

Turning now to FIG. 7A, a flowchart 300 depicts exemplary user operation steps which can be used with the sprinkler system 100 of FIG. 3 when the sprinkler 102 is placed in the same position (and with the same orientation for the sprinkler head position determiner 130) for each use. That is, flowchart 300 assumes that a particular sprinkler program has already been set and recorded per steps 270 and 272 of the flowchart 260 of FIG. 6B. In this instance, in step 302 of the flowchart 300 (FIG. 7A), the sprinkler 102 (FIG. 3) is placed on a sprinkler orientation pad (e.g., sprinkler orienting base 104' of FIG. 5A, or sprinkler orienting base 104" of FIG. 5B). Then in step 304 the water connections are made between the sprinkler and the water main (in the same manner as described above for step 264 of flowchart 260, FIG. 6A), and at step 306 the main water supply valve 167 (FIG. 3) is opened to the full position. At step 308 (FIG. 7A) the user can optionally set a timer (e.g., using the timer control feature 210 in the user interface 200 of FIG. 4), and at step 310 the user engages the "START" command feature (202, FIG. 4) on the user interface 200. Watering of the area to be sprinkled will then proceed.

Figure 7B:
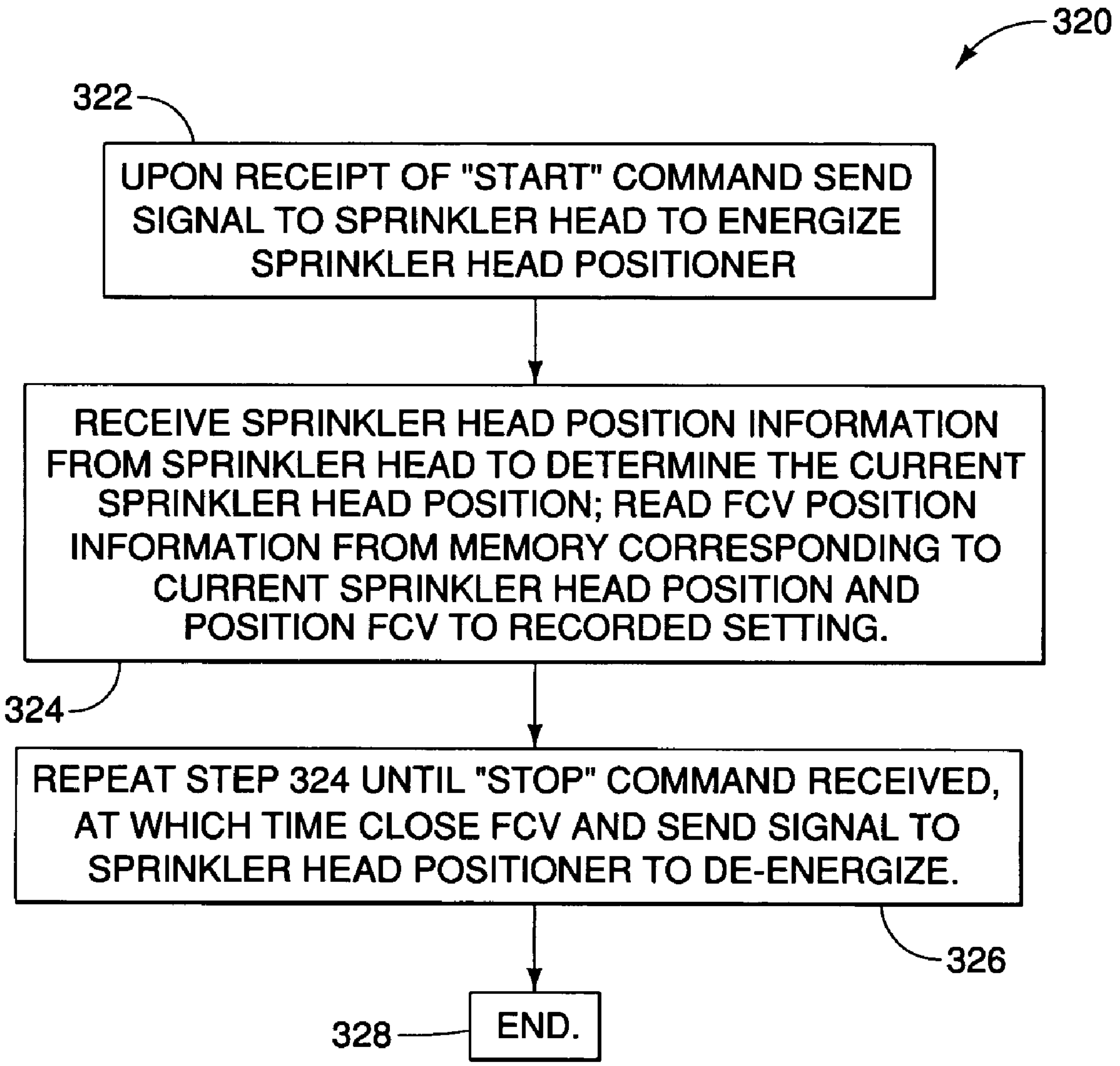
FIG. 7B is a flowchart depicting exemplary system operation steps for a single sprinkler application of the current disclosure for same-position placement of a single sprinkler in accordance with the current disclosure, and in general accordance with the user steps depicted in FIG. 7A.

FIG. 7B is a flowchart 320 depicting exemplary system operation steps which can be performed by the sprinkler system controller 184 for operation of a single sprinkler application of the first embodiment (depicted in FIG. 3) for same-position placement of a single sprinkler 102, following the exemplary situation described above for the user steps depicted in the flowchart 300 of FIG. 7A. The flowchart 320 of FIG. 7B assumes that a sprinkler program has already been recorded according to steps 282 and 284 of the flowchart 280 (FIG. 6B), as described above. Thus, in step 322 of the flowchart 320 (FIG. 7B), upon receipt of a "START" command (e.g., via "START" feature 202 on user interface 200 of FIG. 4), the controller 184 (FIG. 3) sends signal MS1 (FIG. 8) to the sprinkler head motor starter solenoid 152 (FIGS. 3 and 8) to energize the sprinkler head positioner (sprinkler motor 122, FIGS. 3 and 8). Then, in step 324 the controller 184 performs the same steps as described above with respect to step 288 of FIG. 6B (i.e., receiving the then-current sprinkler head position information from the sprinkler position determiner 130, reading the associated flow control valve positioner data from the memory 190, and positioning the flow control valve controller 174 to the corresponding recorded setting). Then, in step 326 of flowchart 320, the program is repeated until the controller 184 is signaled to stop running the program (in essentially the same manner as described above for step 290 of flowchart 280, FIG. 6B). The process then ends at step 328.

Thus, according to flowcharts 300 and 320 (FIGS. 7A and 7B, respectively), once a sprinkling program has been established for a particular area to be sprinkled (and stored in memory 190, FIG. 3), thereafter all the user needs to do in order to sprinkle this area time-and-time again is to place the sprinkler 102 on the orienting sprinkler base 104' of FIG. 5A (or 104", FIG. 5B), make the necessary water connections, and press "START". The sprinkler controller 184 will then read the sprinkler program from the memory 190, and will perform the desired sprinkling of the area until the program is terminated by the user or by a timer.

In one variation on the sprinkler control disclosure provided above, the manual control valve positioner 176 can be eliminated, and the user can manually determine the flow of water to the area to be sprinkled (during the program mode) using the main water supply valve 167. In this variation, the sprinkler system 100 is provided with the water flow detector 194 (described above), and the user operation of the system (and the subsequent system operation), as respectively described in the flowcharts 260 and 280 of respective FIGS. 6A and 6B, will vary. Specifically, in the user operation described in flowchart 260 (FIG. 6A), in step 270 the user adjusts the main water supply valve (167, FIG. 3) in order to achieve the desired flow. Following step 272 (which sets, or records, the sprinkling program), the user opens the main water supply valve to the full open position, and the program is run. Further, in step 284 of flowchart 280 (FIG. 6B), rather than recording flow valve positioner information as a function of sprinkler head position, water flow data (e.g., signal FL1, FIG. 8) from flow detector 194 is recorded as a function of sprinkler head position, and then in step 288 (i.e., the run mode) the flow control valve positioner 174 is set to establish the desired (and recorded) flow as a function of the then-current sprinkler head position.

As may be evident from the above disclosure, during the program mode (e.g., step 284 of flowchart 280, FIG. 6B) the controller 184 will record the then-current position of the flow control valve positioner 174 (FIG. 3) as a function of the then-current sprinkler head position (as determined by sprinkler head position determined 130). However, since the sprinkler head position determined 130 will typically include a plurality of discrete sprinkler head position indicator sensors (e.g., the 25 discrete contact points 256 indicated in the plan view of the rotary encoder base 134 of FIG. 3A), and each discrete sprinkler head position indicator sensor (e.g., contact point 256) covers a predetermined span (12.4 degrees, in the given example), then this raises the question of exactly what associated flow control valve positioner data will be recorded for each given discrete sprinkler head position indicator sensor? That is, assuming that the user will be able to variably adjust the flow (using the manual control flow valve positioner 176, FIG. 3) during the time in which the encoder contact 131 travels over a contact point 256 (FIG. 3A), then typically the recorded control valve position associated with the specific contact point 256 will be the last recorded control valve position. Thus, for example, if the sprinkler motor 122 (FIG. 3) is configured to rotate the sprinkler head 108 through an arc of 360 degrees in one minute (i.e., one revolution per minute), and the span between the beginning of adjacent contact points 256 is 14.4 degrees (following the example set forth in FIG. 3A), then the elapsed time for the encoder contact 131 (FIG. 3) to move over an entire contact point 256, and the adjacent spacer 257, will be 2.4 seconds. As can be appreciated, during this 2.4 second interval a user can potentially make considerable adjustments to the manual control valve positioner 176 (FIG. 3). And if the last recorded control valve positioner data is used for the entire 14.4 degree arc segment, then this may not be representative of the entire segment. Accordingly, it is desirable to offer a control logic program in controller 184 to address this situation. That is, since position determiners (such as sprinkler head position determiner 130) are generally discrete in nature (and thus cannot make not make infinitely fine distinctions between one position and another), and the cost of discrete positioner determiners increases exponentially as does the number of discrete positions available for detection, it is desirable to supplement the controller 184 for the sprinkler system 100 with a routine (or program) which can take into account the undesirable effects introduced by a discrete position determiner (e.g., position determiner 130, FIG. 3) having a limited number of position determiner contacts 256 (FIG. 3A).

In order to address the situation described immediately above, in one variation the controller 184 can be provided with the travel rate of the encoder contact 131 over the encoder base 134 (and more specifically, the travel rate, in degrees per second, over each contact point 256 and adjacent spacer 257). In this case the controller 184 will be able to determine approximately where on each given contact point 256 the encoder contact 131 is located, and the controller 184 can then record control valve positioner information not only as a function at the then-current contact point, but also as a function of the approximate position of the encoder contact on a specific contact point (and an adjacent spacer 257). For example, if it takes 2.4 seconds for the encoder contact 131 to traverse an entire contact point 256 and an adjacent spacer 257, then the controller 184 can record various control valve positioner data every 0.2 seconds (for approximately 12 different potential recorded control valve positioner settings over each 14.4 degree arc) during the elapsed 2.4 second interval. These 12 recorded control valve positioner settings can then be used (in the run mode) to variably adjust the control valve positioner over the 2.4 second interval for an associated contact point 256.

In another variation in order to address the situation described above, a clock timer (e.g., via clock 196, FIG. 3) can be started each time the encoder contact 131 initially contacts a contact point 256, and can be stopped once the encoder contact moves out of contact with the contact point. During this timed event, various control valve positioner data can be periodically recorded (e.g., every 0.2 seconds). The controller 184 can then average the control valve positioner data for the segment associated with a particular contact point 256, and use the average setting as the control valve positioner setting for the particular segment defined by the contact point 256 and its adjacent spacer 257.

As can be appreciated from the above disclosure, other control logic routines which can be performed by controller 184 can be implemented to reduce the effects of a discrete sprinkler head positioner determiner 130 (as described above). This ability to programmably provide finer control of the control valve positioner 174 between adjacent discrete sprinkler head position determiner contacts 256 further distinguishes the system disclosed herein over the prior art.

In a further variation the sprinkler head positioner (e.g., 121, FIG. 3) can be a two-speed positioner, having a first speed and a second speed which is higher than the first speed. The sprinkler head positioner can be configured to operate at the second (higher) speed when the sprinkler head is transitioning segments where no watering is to be applied within the potential sprinkling area that can be sprinkled by the sprinkler. In this way the sprinkler head (e.g., 108, FIG. 3) can more rapidly apply water to the area to be sprinkled by quickly moving past areas (arc segments) where no watering is to be applied. For example, in FIG. 9 the arc segments 330 and 332 are not to be watered. It is thus advantageous to quickly move the sprinkler head 108 past these segments so that watering can resume in the adjacent segments (e.g., segments 342 and 344). In one exemplary implementation of this variant, the sprinkler motor 122 of FIG. 3 can be a two-speed motor, and the sprinkler motor can be switched between the first and second speeds by the sprinkler control unit 150. For example, the sprinkler control unit 150 can increase voltage, or amperage, to the sprinkler motor 122 to cause it to move at the second, faster speed. In another example, the sprinkler motor 122 can be provided with a two-speed gearbox (not shown), and the sprinkler control unit 150 can switch the gearbox between the two different speeds. Further, the main sprinkler controller 184 can be provided with a sprinkler head positioner speed subroutine (or program), such that once a user sets a desired sprinkling program (e.g., using the SET function 204 for the user interface 200 of FIG. 4), the sprinkler head positioner speed subroutine is run. This subroutine will cause the controller 184 to review the recorded data for the sprinkler program and to identify any arc segments for which no sprinkling is to be applied. For any such identified segment, the controller 184 will assign the second (or higher) sprinkler head position determiner speed to that segment. This sprinkler head positioner speed data can then be stored in the memory 190. Then, as the sprinkler program is performed in the run mode, the controller 184 will read from the memory 190 (for any then-current sprinkler head position) not only associated control valve positioner data, but also sprinkler head positioner speed data. The controller 184 can then instruct the sprinkler control unit 150 to increase the speed of the sprinkler motor 122 for those positions where no sprinkling is to be provided.

In yet a further variation, the sprinkler system 100 of FIG. 3 can be provided with a sprinkler head direction reversing program in order to reverse the direction of travel of the sprinkler head (e.g., sprinkler head 108) when large areas of non-sprinkling (within the potential area of sprinkling) are encountered. For example, if there is a contiguous arc of 85 degrees or more within a 360 degree total span which can be covered by the sprinkler head, then it can be desirable to reverse the direction of travel of the sprinkler head when this arc is reached, rather than traverse the arc and provide no watering (sprinkling) during the time it takes for the sprinkler head to traverse this arc. By reversing the direction of travel of the sprinkler head when reaching a relatively large arc of no-watering, the time expended to water (sprinkle) the area to be watered can be reduced (as compared to traversing the relatively large arc of no-watering for each rotation of the sprinkler head). One exemplary sprinkler head direction reversing program is depicted in the flowchart 370 of FIG. 10. The flowchart 370 of FIG. 10 includes a step (step 384) to further incorporate the two-speed sprinkler head positioner variation described above. However, it will be appreciated that the sprinkler head direction reversing program depicted by the flowchart 370 can also be implemented without step 384.

Figure 10:
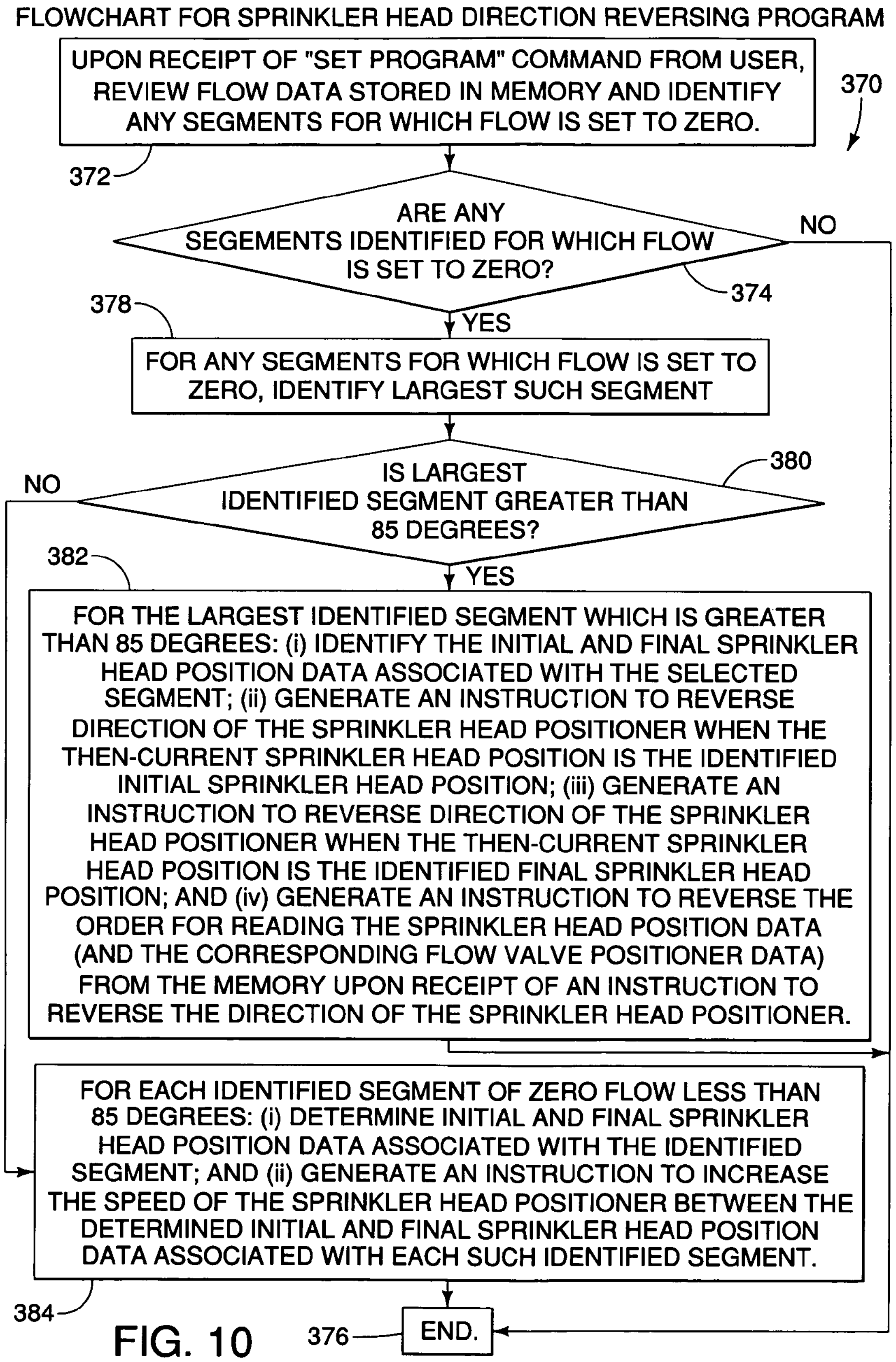
FIG. 10 is a flowchart depicting an exemplary sprinkler head direction reversing program which can be used at least in conjunction with the sprinkler system embodiments described herein.

With respect to the flowchart 370 of FIG. 10, the sprinkler head reversing program is initiated at step 372 when a user enters a "set" or "start" command following entry of a sprinkling program (as exemplarily set forth above in the flowchart 260 of FIG. 6A, and specifically at step 272). In step 372 (FIG. 10), upon receipt of the "start" command (or an equivalent command), the main controller 184 (FIG. 3) reviews the flow data stored in the memory 190 for the given sprinkling program and identifies any segments (or arcs of potential sprinkler head coverage) for which flow is set to zero. At step 374, if no segments of zero flow are identified in step 372, then the sprinkler head reversing program terminates at step 376. However, if at 374 it is determined that segments of zero flow have been identified in step 372, then at step 378 the controller identifies the largest such segment where flow is set to zero. Then, at step 380, the controller 184 determines if the largest such identified segment of zero flow is greater than 85 degrees. (It will be appreciated that the indicated value of 85 degrees in step 380 is somewhat arbitrary, and that greater or lesser values can be used as the threshold for determining that the sprinkler head positioner should be reversed.)

In the example depicted in FIG. 10, if at step 380 it is determined that the largest identified segment of zero flow is not greater than 85 degrees, then the controller 184 proceeds to step 384, which implements the two-speed sprinkler head positioner variation described above. (If step 384, i.e., the two-speed sprinkler head positioner variation, is not provided for, then the "No" determination at step 380 directs the controller 184 to proceed to the "End" step 376—i.e., if no segment of zero flow (or sprinkling) is identified at step 380 which reaches the criteria for reversing the direction of the sprinkler head positioner, then the sprinkler head reversing program will terminate without providing for any sprinkler head reversing.) However, assuming that the two-speed sprinkler head positioner variation is allowed for (in conjunction with the sprinkler head direction reversing program), then at step 384 for each identified segment of zero flow less which is less than 85 degrees, the controller 184 will perform the following steps: (i) determine the initial and final sprinkler head position data associated with the identified segment of zero flow; and (ii) generate an instruction (i.e., a program step, to be stored as part of the run-mode program) to increase the speed of the sprinkler head positioner between the determined initial and final sprinkler head position data associated with each such identified segment of zero flow.

Returning to step 380 of flowchart 370, if it is determined that the largest segment of zero flow is greater than 85 degrees (or whatever the threshold value of the arc is selected to be), then the controller 184 (FIG. 3) proceeds to step 382. At step 382, for the largest identified segment which is greater than 85 degrees, the controller 184 will identify the initial and final sprinkler head position data associated with the selected segment. The controller 184 can then generate instructions to reverse the direction of the sprinkler head positioner when the then-current sprinkler head position is either the initial or the final sprinkler head position for that largest segment which is greater than 85 degrees. Also, the controller can generate an instruction to reverse the order for reading the sprinkler head position data (and the corresponding flow valve positioner data) from the memory 190 upon receipt of an instruction to reverse the direction of the sprinkler head positioner. Thereafter, the controller 184 ends the programming process at step 376.

Second embodiment: Multiple sprinklers controllable for area-programmable coverage of area (or areas) to be sprinkled.

The second embodiment provides for a sprinkler system having a plurality of sprinklers which can all be controlled by a single controller in order to provide area-programmable sprinkling to one or more areas to be sprinkled. A typically application of this second embodiment is an in-ground sprinkler system, such that the sprinklers are located in constant, fixed positions. In this second embodiment the area to be sprinkled can be a single contiguous area which requires two or more watering stations (i.e., sprinklers) in order to cover the entire area (as may be required due to water supply pressure constraints), or two or more separate areas which each require at least one watering station (sprinkler) for each area.

The general configuration of a sprinkler system in accordance with the second embodiment includes a plurality of sprinkler heads, each sprinkler head adapted to move between a first sprinkler head position and a second sprinkler head position to thereby apply water to the area desired to be sprinkled. Each sprinkler head in the system includes a water discharge nozzle (e.g., discharge nozzle 110 of FIG. 3), a sprinkler head positioner adapted to move the sprinkler head between the first and second sprinkler head positions (e.g., sprinkler head positioner 121 of FIG. 3), and a sprinkler head position determiner adapted to determine a current sprinkler head position between the first and second sprinkler head positions (e.g., sprinkler head position determiner 130 of FIG. 3). The sprinkler system also includes a sprinkler water manifold which has a water supply connection adapted to be connected to a main water supply, a plurality of water outlet conduits, each water outlet conduit capable of being placed in fluid communication with a respective sprinkler head, and a sprinkler head selector valve (or a plurality of sprinkler solenoid valves) to enable selective placement of each water outlet conduit in fluid communication with the water supply connection. The sprinkler system further includes a flow control valve (e.g., flow control valve 172 of FIG. 3) disposed between the water supply connection and the sprinkler head selector valve (or the plurality of sprinkler solenoid valves). The flow control valve is adapted to control flow of water from the water supply to one of the water outlet conduits currently selected by the sprinkler head selector valve (or by any given sprinkler solenoid valve). The sprinkler system further includes a flow control valve positioner (e.g., flow control valve positioner 174 of FIG. 3) which is adapted to establish a current control valve position of the flow control valve between an essentially fully closed control valve position and an essentially fully open control valve position. The sprinkler system can also include a flow control valve position determiner adapted to determine the current control valve position, and to generate a current flow control valve position signal in response thereto. Similar to the first embodiment, the sprinkler system of the second embodiment also includes a controller (which can be generally similar to controller 184 of FIG. 3) adapted to selectively receive a sprinkler head position signal from each sprinkler head position determiner, and to send a control valve control signal to the flow control valve positioner in response thereto. Likewise, the sprinkler system of the second embodiment includes a means for a user to position the flow control valve positioner during a program mode in the controller (e.g., manual control valve positioner 176 of FIG. 3, or electronic flow control valve feature 214 on user interface 200 of FIG. 4). The sprinkler system of this second embodiment will also include a memory device (e.g., memory 190 of FIG. 3) which can record a plurality of the current control valve position signals during the program mode. In this second embodiment, the controller is adapted to record in the memory device the plurality of current control valve position signals during the program mode for each sprinkler head, and to correlate each of the current control valve position signals with a corresponding current sprinkler head position as determined by a contemporaneous (or then-current) sprinkler head position signal received by the controller. The controller thereafter can use the correlated current control valve position signals and the current sprinkler head position signals from the program mode in a run-mode to send the control valve control signal to the flow control valve positioner. We will now describe one exemplary implementation of a sprinkler system in accordance with this second embodiment.

Figure 11:
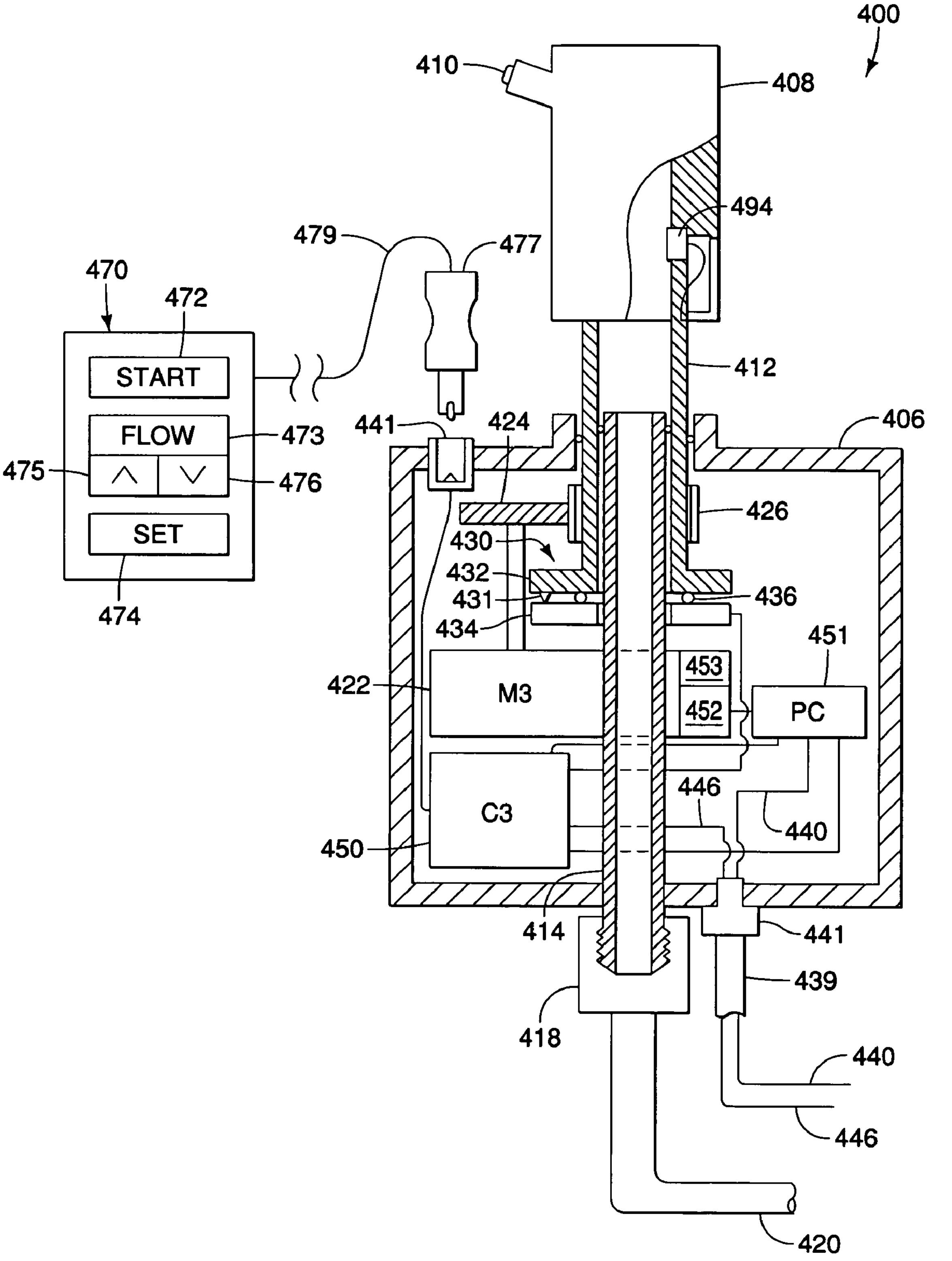
FIG. 11 is a side elevation sectional view depicting an exemplary sprinkler that can be used with a sprinkler system in accordance with a second embodiment provided for herein.

FIG. 11 is a side elevation sectional view depicting a sprinkler 400 which can be used to implement the second described embodiment. The sprinkler 400 of FIG. 11 includes many of the same (or similar) components described above with respect to the sprinkler 102 of FIG. 3. Thus, in the following description for common components between the sprinkler 400 of FIG. 11 and the sprinkler 102 of FIG. 3, reference may be made to the description of FIG. 3 for the sake of brevity. The sprinkler 400 of FIG. 11 includes a sprinkler housing 406 and a sprinkler head 408. Sprinkler head 408 includes a water flow discharge nozzle 410 which is in fluid communication with sprinkler head water conduit 412. The sprinkler head water conduit 412 can be provided with water via the sprinkler body water conduit 414, which can in turn be connected to the sprinkler water supply conduit 420 (which can be at least in part underground water tubing) via water connector 418. Sprinkler 400 can be a pop-up type of sprinkler (even though not depicted as such in FIG. 11 for the sake of simplifying the drawing figure). In that event, housing 406 can be enlarged and modified to accommodate a recessed sprinkler head 408, and the sprinkler head 408 can be mounted on a telescoping water conduit such that when pressurized water pressure is applied to the sprinkler head, the sprinkler head will "pop-up" along the telescoping water conduit. Further, either gravity or a spring can bias the sprinkler head 408 into the non-deployed position when water pressure is not being applied to the sprinkler head. The sprinkler 400 includes a sprinkler head positioner, here depicted as sprinkler motor M3 (422) which drives main gear 424, and thus in turn sprinkler head gear 426 (which is secured to the sprinkler head water conduit 412). The sprinkler motor 422 can be similar to sprinkler motor 122 of FIG. 3, and can include a motor starter solenoid 452 (similar to motor starter solenoid 152 of FIG. 3), and can be further optionally provided with a sprinkler motor reversing unit 453 (similar to reversing unit 153 of FIG. 3). Sprinkler 400 further includes a sprinkler head position determiner 430, which can be similar to the sprinkler head position determiner 130 of FIG. 3. As depicted, the sprinkler head position determiner 430 is a rotary encoder, including a fixed base 434, a position determiner contact 431 which is supported on a sprinkler head platform 432, and a bearing 436. Components 434, 431, 432 and 436 of sprinkler head position determiner 430 can all be similar to their respective counterpart components 134, 131, 132 and 136 of the sprinkler head position determiner 130 of FIG. 3, all described above. The sprinkler 400 can optionally include a flow detector which can operate similar to the flow detector 194 described above with respect to FIG. 3. In the embodiment depicted in FIG. 11, the flow detector is a pressure sensor 494 which is located within the sprinkler head 408. In this example, the pressure sensor 494 can send a pressure signal to the sprinkler control unit 450 (described more fully below) via a rotary contact (not shown) incorporated into the sprinkler head position determiner 430. In another variation, the pressure sensor 494 can be located within the sprinkler body water conduit 414. In a further variation, the flow detector can be an impeller placed at least partially in the fluid stream between the sprinkler water supply conduit 420 and the discharge nozzle 410.

The sprinkler 400 of FIG. 11 is further depicted as including sprinkler control unit C3 (450) which can include a processor (not shown). The sprinkler control unit 450 can process the receipt of, and transmission of, signals relative to the operation of the sprinkler 400 within the overall sprinkler system (e.g., sending then-current position signals from the sprinkler head position determiner 430 to a main controller, receiving and relaying motor start signals to motor starter solenoid 452, controlling the speed of sprinkler motor 422, and receiving programming signals from programming port 441 (which will be described more fully below).

Whereas the sprinkler 102 of FIG. 3 is depicted as including a battery 140 in order to power the sprinkler motor 122 and other components in the sprinkler 102, the sprinkler 400 of FIG. 11 can be provided with electrical power via a power line 440, which can be run in an underground electrical conduit 439. (In one variation, underground electrical conduit 439 and underground water tubing 420 can be run together in a single integrated tubing, as described above with respect to the integrated conduit 360 of FIG. 3B.) Underground electrical conduit 439 can be connected to the sprinkler head 400 via an electrical connector 441 to facilitate ease of installation of the sprinkler head 400. Power line 440 can be routed to a power controller PC (451) which can distribute power to the sprinkler motor 422 (and motor components 452 and 453, if provided), and the sprinkler control unit 450. Power controller 451 can also include a transformer (not shown) to step-down (or step up) the power provided by power line 440. The underground electrical conduit 439 can also include one or more signal cables 446 which can be used to communicate signals between the sprinkler control unit 450 and the main sprinkler controller (described below).

In the sprinkler system of this second embodiment, it can be the case that one or more of the sprinklers is not within line of sight of the main sprinkler controller. As can be appreciated, it is desirable that a user be able to view a sprinkler head while setting a sprinkling program such that the user can verify that the area to be sprinkled is indeed being sprinkled, with minimal overspray. However, if the flow control device which enables the user to adjust the flow of water to the sprinkler during the program mode is located at a main controller, and not within sight of the sprinkler, then it will be very difficult for the user to set a desired flow program. In order to address this situation the sprinkler system can be provided with a remote programming unit 470 (FIG. 11) which allows the user to be located proximate the sprinkler 400 during the program mode. The remote programming unit 470 can communicate with the sprinkler control unit 450 via a wireless connection (similar to the remote user interface 200' of FIG. 3, described above). However, wireless communication between the remote programming unit 470 and the sprinkler control unit 450 requires that the remote programming unit 470 be provided with a wireless transmitter, and the sprinkler control unit 450 be provided with a wireless receiver. In order to simplify the design of both the remote programming unit 470 and the sprinkler control unit 450, the remote programming unit 470 can communicate with the sprinkler control unit 450 via a signal cable 479. The signal cable 479 is connected directly to the remote programming unit 470 at a first end, and to a plug-in connector 477 at a second end. The plug-in connector 477 is configured to plug into the signal port 441 of the sprinkler 400 in order to establish signal communication between the remote programming unit 470 and the sprinkler control unit 450. As will be appreciated, this will also establish signal communication between the remote programming unit 470 and the main sprinkler system controller (584 of FIG. 12, described more fully below) via signal cable 446. The remote programming unit 470 can include the flowing user controls: a START feature 472 to start the program mode for the sprinkler 400; a FLOW feature 473 (including respective increase-flow and decrease-flow controls 475 and 476) to enable the user to adjust the flow of water to the sprinkler head during the program mode; and a SET feature 474 to enable the user to indicate that programming of flow to the sprinkler 400 has been completed, and to terminate the program mode for that particular sprinkler. As can be appreciated, the remote programming unit 470 allows a user to move from one sprinkler to the next, and thereby set a flow program for each sprinkler within the overall sprinkler system.

Figure 12:
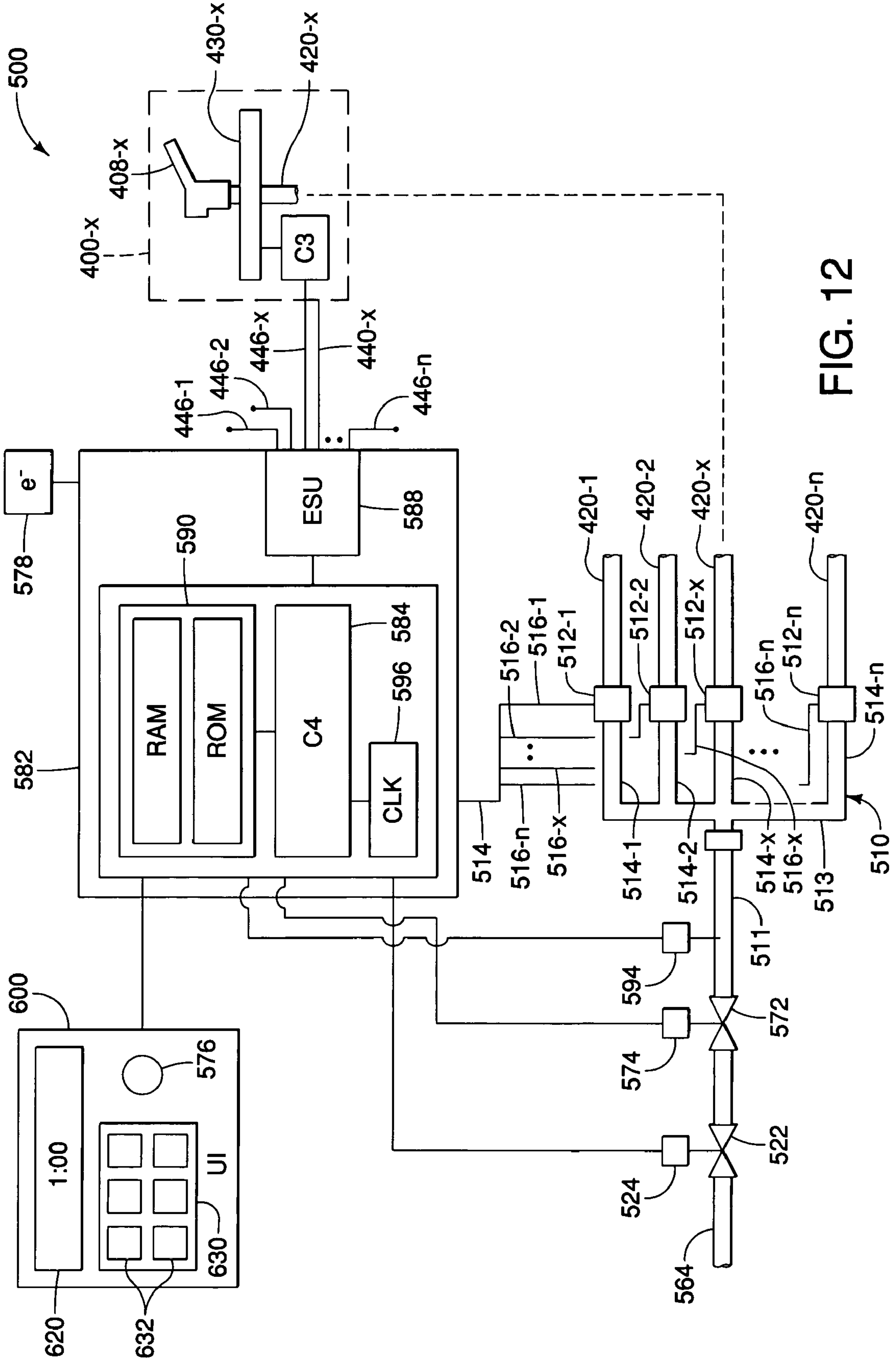
FIG. 12 is a schematic diagram depicting an exemplary sprinkler system in accordance with the second embodiment provided for herein.

Turning now to FIG. 12, a schematic diagram depicts an exemplary sprinkler system 500 in accordance with the second embodiment. The sprinkler system 500 includes a plurality of sprinklers (only one of which is depicted as sprinkler 400-X), each of which can be implemented as the sprinkler 400 of FIG. 11. (For purposes of the following discussion, it will be assumed that the sprinkler system 500 is configured to distribute water to "n" different sprinklers, starting with a sprinkler 400-1 (not shown) and continuing through to a sprinkler 400-n (also not shown), with sprinkler 400-X being one of the sprinklers. Sprinkler 400-X is depicted as including sprinkler head 408-X and sprinkler head position determiner 430-X.) The sprinkler system 500 further includes a main sprinkler control unit 582, and a user interface 600 which is in signal communication with the main sprinkler control unit 582. Sprinkler system 500 also includes a sprinkler selection water manifold 510 which is in fluid communication with a water main source 564, and which can selectively distribute water to each of the sprinklers. The flow of water from the water main source 564 to each individual sprinkler 400-1 to 400-n can be variably adjusted via a flow control valve 572, which can be selectively positioned via flow control valve positioner 574 (which is in signal communication with the main sprinkler control unit 574). The flow control valve 572, and the flow control valve positioner 574, can be implemented as described above with respect to the flow control valve 172, and the flow control valve positioner 174, of FIG. 3.

As indicated above, the sprinkler system 500 of the second embodiment is generally intended to operate as an in-ground sprinkler system, and therefor can include many of the features of prior-art in-ground sprinkler systems (i.e., a user can set a desired sprinkling regimen for the system to enable watering by the sprinklers 400-1 through 400-n at various times, and at various days of the week, such that once the desired sprinkling regimen has been entered into the main sprinkler control unit 582, the sprinkler system 500 will operate on a day-to-day basis without further user intervention). It will be appreciated that the sprinkler system 500 can also be implemented using a plurality of moveable sprinklers (e.g., sprinklers 102 of FIG. 3.) However, for purposes of the following discussion the sprinkler system 500 of FIG. 12 will be exemplarily described as an in-ground sprinkle system. Accordingly, a general exemplary description of the operation of the sprinkler system 500 is as follows: a user programs each of the sprinklers 400-1 through 400-n to provide the desired watering (or sprinkling) for each area to be watered by the respective sprinkler, using the user interface 600 and/or the remote programming unit 470 of FIG. 11; the user further programs (via user interface 600) a desired start time for the sprinklers 400-1 through 400-n to begin their watering of the various areas to be watered (and potentially including selected days of the week for each sprinkler to perform its watering); the main sprinkler control unit 582 thereafter selectively enables water from the water main source 564 to be provided to the individual sprinklers 400-1 through 400-n, and during the time that water is provided to any given sprinkler the flow control valve 572 (as controlled by the flow control valve positioner 574) controls flow of water to the given sprinkler (and thus, to the potential area which can be sprinkled by that sprinkler) as determined by the sprinkler flow program previously determined by the user for that sprinkler. (This operation of the sprinkler system will be described in further detail below with respect to the flowchart 700 of FIGS. 13A and 13B.) A more detailed discussion of the components of the exemplary sprinkler system 500 (which were described generally above) will now be provided.

With respect to FIG. 12, the main control unit 582 of the sprinkler system 500 can be provided with electrical power from power source 578. The main control unit 582 can include a main controller C4 (584), a memory device 590 (including RAM and ROM type memory), and a clock CLK (596), all of which can be configured similar to their respective counterparts 184, 190 and 196 of the sprinkler system 100 of FIG. 3, described above. The main control unit 582 can also include an electrical switching unit ESU (588) which can selectively switch signal communication between the main controller 584 and each sprinkler control unit (e.g., sprinkler control unit 450 of FIG. 11) e.g., via signal lines 446-1 through 446-n. (Signal lines 446-2 and 446-x are depicted as exemplary signal lines between the first and last respective signal lines 446-1 and 446-n. Signal line 446-X places sprinkler control unit 450-X in signal communication with the main sprinkler control unit 582.) The electrical switching unit 588 can also selectively provide electrical power to the various sprinklers 400-1 through 400-n (as exemplarily indicated by power line 440-X) under control of the main controller 584.

The user interface 600 of the sprinkler system 500 of FIG. 12 is in signal communication with the sprinkler system main control unit 582, and can include a display device 620 and a user data entry device 630 (such as keypad or the like). The data entry device 630 can enable a user to select a sprinkling regimen, which can include the following: duration of watering (sprinkling) to be performed by each sprinkler 400-1 through 400-n; days of the week during which each sprinkler is to perform watering; and a start time for sprinkling to begin on any given day of the week. This information can be entered into the user interface 600 via selected data entry features (such as keys 632) on data entry device 630. (It will be appreciated that programming a sprinkling regimen for a plurality of sprinklers (or sprinkling stations, which may include more than one sprinkler) is well known (save for the aspect of establishing a specific flow program for each individual sprinkler), and that further description of the components (and programming steps) required to implement such a basic sprinkling regimen program is not necessary in order to enable this particular aspect of the current embodiment.) The user interface 600 can further include a manual control valve positioner 576 which can be used by the user during the program mode in order to manually position the flow control valve positioner (e.g., flow control valve positioner 574) during the program mode for any given sprinkler 400-1 though 400-n. The manual control valve positioner 576 can be used as an alternative (or supplement) to the remote programming unit 470 described above with respect to FIG. 11.

As generally described above, the sprinkler system 500 provides water from a main water supply 564 to each of the sprinklers 400-1 though 400-n via the sprinkler selection manifold 510. A water main solenoid valve 522 can optionally be provided between the main water supply 564 and the sprinkler selection manifold 510, and can be actuated by a water main valve solenoid 524. The water main valve solenoid 524 can be actuated under the control of the main control unit 578 to open the main solenoid valve 522 when sprinkling is to be provided by any of the sprinklers 400-1 through 400-n. For example, if a sprinkler regimen program (which can be stored in memory 590) specifies that a sprinkling regimen is to begin at 4:00 a.m., then main controller 584 can determine from the clock 596 when it is 4:00 a.m., and at that time can send a signal to the main valve solenoid 524 to open the main solenoid valve 522.

As indicated above, the flow control valve 572 can be positioned between the main water supply conduit 564 and the sprinkler selection manifold 510. (Controlled-water-flow conduit 511 is disposed between flow control valve 572 and sprinkler selection manifold 510.) A flow detector 594 can be positioned to measure (or approximate) flow within controlled-water-flow conduit 511. Flow detector 594 can operate similar to flow detector 194 of FIG. 3, described above. That is, during the program mode the flow detector 594 can measure (or approximate) the flow of water after the control flow valve 572 and to sprinkler 400-x (i.e., the then-current selected sprinkler), and this flow data can be stored in memory 590. Thereafter, in the run mode, the then-current flow for any given sprinkler head position (and for any given sprinkler head) can be detected by the flow detector 594, and can thereafter be compared with the desired recorded flow (i.e., recorded during the program mode) for the then-current sprinkler head position (and then-current sprinkler being used). If the flow (as determined by the flow detector 594) has varied from the desired programmed flow (e.g., as a result of variance in the water pressure in the water supply 564), the controller 584 can then calculate a correction for the control valve positioner 574 in order to match the then-current flow to the desired flow. The flow detector 594 can basically be used as an alternative to the flow detector 494 located in the sprinkler head (400, FIG. 11).

In the example of FIG. 12, the sprinkler selection manifold 510 includes a main distribution conduit 513 which is in fluid communication with a plurality of sprinkler branch water conduits 514-1 through 514-n (i.e., one sprinkler branch conduit for each of sprinklers 400-1 through 400-n). Further, each sprinkler branch water conduit 514-1 through 514-n can be selectively placed in respective fluid communication with an associated (and respective) sprinkler water conduit 420-1 through 420-n via a respective sprinkler solenoid valve 512-1 through 512-n. Sprinkler solenoid valves 512-1 through 512-n can be selectively actuated by the main control unit 582 under the direction of a sprinkler regimen (or system) program stored in memory 590, which can be executed by a run program via main controller 584. As exemplarily depicted, sprinkler branch conduit 514-X (located after sprinkler branch conduit 514-2) can be placed in fluid communication with sprinkler water conduit 420-X (located after sprinkler water conduit 420-2) via sprinkler solenoid valve 512-X (located after sprinkler solenoid valve 512-2). Each of the sprinkler solenoid valves 512-1 through 512-n can be actuated by a sprinkler solenoid signal line (516-1 through 516-n, and including sprinkler solenoid signal lines 516-2 and 516-X), all of which can be multiplexed on main sprinkler solenoid valve signal line 514 via main controller 584.

In one variation, in order to allow multiple sprinklers 400-1 through 400-n to be operated simultaneously, each of the sprinklers to be operated simultaneously can include a flow control valve (similar to flow control valve 572, FIG. 12) located within the sprinkler itself. The main controller 584 can then run parallel sprinkling programs for the plurality of sprinklers that are being operated simultaneously. All of the sprinklers 400-1 through 400-n can include a flow control valve (even if certain of the sprinklers are not intended to be run simultaneously), in which case similar flow control valve 572 can be eliminated. Optionally, the sprinkler system 500 can include flow control valve 572, and selected ones of the 400-1 through 400-n can be provided with individual flow control valves. In this last arrangement when a sprinkler having its own control valve is being operated, then the flow control valve 572 can be placed in a fully opened position.

The user steps for programming each individual sprinkler in the system 100 can generally follow the sequence of steps (beginning at step 268) described above with respect to the flowchart 300 of FIG. 6A. The user can use the remote programming unit 470 of FIG. 11, going from one sprinkler head to the next, until all of the sprinkler heads are programmed. When the user enables the "START" feature 472 on the remote unit 470, the remote unit can send a signal (e.g., via signal line 446) to the main sprinkler control unit 582 (FIG. 13) to open the appropriate sprinkler solenoid valve (from valves 512-2 through 512-n), and the main supply valve 522 (if so provided). The remote programming unit 470 can also cause the main controller 584 to begin recording the sprinkling program for that sprinkler in the memory 590. Following programming of the individual sprinklers 400, the user can then program the main sprinkler system program using the user interface 600 (FIG. 12). The sprinkler system program (which can be stored in memory 590) can determine which sprinklers are to be actuated on which days of the week, start times, and duration run times. (The sprinkler system program can be set either before or after programming the individual sprinklers 400 in the system 500.) Thereafter, the system 500 will run automatically per the sprinkler system program. (User interface 600 can also allow a user to run individual sprinklers outside of the sprinkler system program in a manual mode.)

Figure 13A:
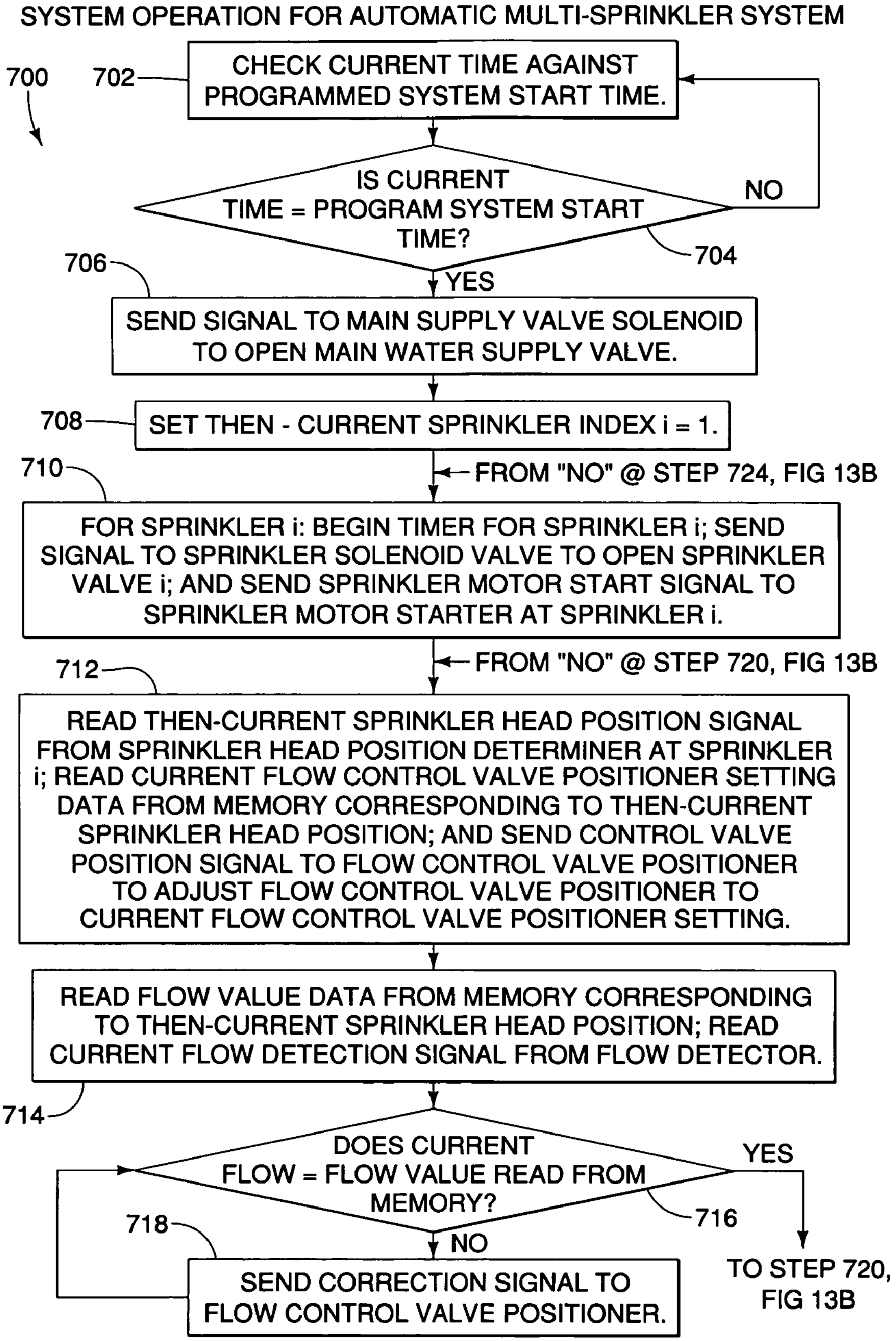
FIGS. 13A and 13B together are a flowchart depicting exemplary system operation steps for an automatic multi-sprinkler system of the current disclosure.
Figure 13B:
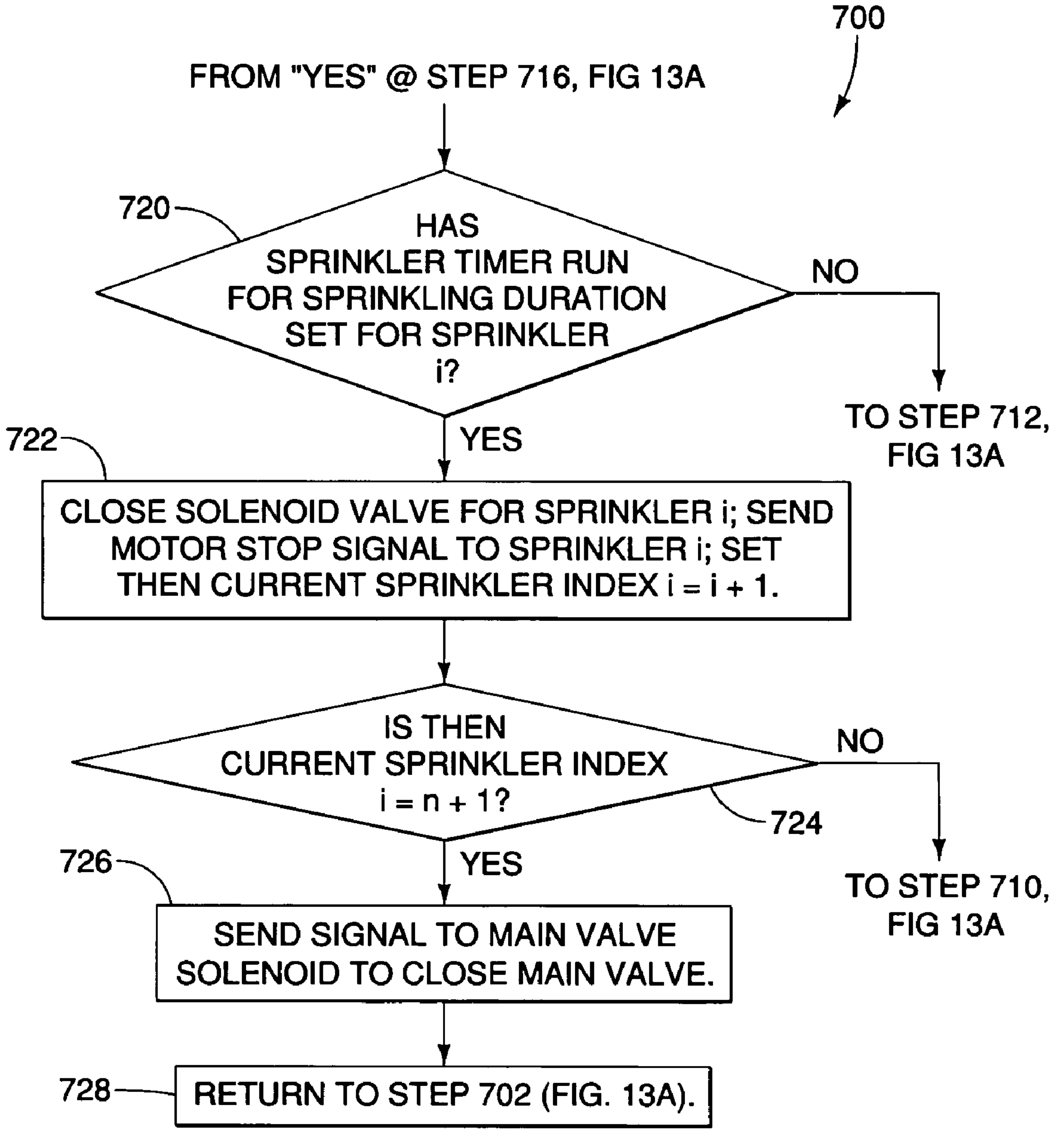

FIGS. 13A and 13B together are a flowchart 700 depicting exemplary system operation steps for running an automatic sprinkler system program for the sprinkler system 500 of FIG. 12. For purposes of simplifying the flowchart, any steps for determining day-of-week are not included, it being well understood how such can be easily incorporated into the program as an initial step. Further, the sprinkler system program 700 assumes that all sprinklers are to be run during the program. In one variation, the system can be configured to allow a user to run two different programs—e.g., a program "A" can provide for running sprinklers 400-1 through 400-X on Monday, Wednesday, and Friday, and a program "B" can provide for running sprinklers 400-X+1 through 400-n on Tuesday, Thursday and Saturday. The user can program both programs "A" and "B" by selecting the specific program via the user interface 600 during the sprinkler system programming mode. Further, the sprinkler system program 700 assumes all of the sprinklers are run sequentially, starting with the first sprinkler. That is, once one sprinkler has run for its predetermined interval, the system program moves to the next sprinkler and so on, until the last sprinkler has run for its predetermined interval, at which time running of the system stops until the next start time is detected. The sprinkler system program 700 also assumes that only one sprinkler is run at a time. However, it will be appreciated that the system 500 can be arranged such that two or more sprinklers run simultaneously. This feature has not been included in the flowchart 700 for the sake of simplicity. However, it will be appreciated that when two or more sprinklers are run simultaneously, providing flow detection using the pressure sensor 494 in the sprinkler 400 (FIG. 11) can be useful since the variable volume flow in each of the sprinklers can affect the flow to other sprinklers being simultaneously run. In yet another variation, the sprinklers 400-1 through 400-n in any given system 500 can either be ordered in a pre-assigned order (in the control unit 582), or alternately the user interface 600 can enable the user to assign the order of the sprinklers (i.e., which specific sprinkler will be designated as sprinkler 400-1, which will be 400-2, and so on). In general the available complexity (and flexibility) for any given sprinkler program which can be set by a user can be determined at least in part by the specific application in which the sprinkler system 500 is being used. For example, if the system 500 is to cover a large number of different areas to be sprinkled having many different complex shapes, a user interface can be provided which allows the user a high degree of flexibility in setting the sprinkler system program. Thus, when installing a sprinkler system 500 the installer may choose to use one kind of user interface 600 (and control unit 582) over another depending on the complexity required in order to achieve the desired sprinkling. As can be appreciated, a user can realize a cost savings by purchasing only as complex of a control unit (582) and user interface (600) as is required for the specific system implementation (it being appreciated that, for example, a control unit 584 which can handle 20 different sprinklers will generally cost more to implement than a control unit which can handle only 5 sprinklers). Thus, the flowchart 700 of FIGS. 13A and 13B is not intended to show all possible program features which can be used in a sprinkler system program, but is intended more to demonstrate how the variable-area individual sprinkler program can be incorporated into a larger sprinkler system program.

Turning now to FIG. 13A, at step 712 the system program reads the current time (e.g., from clock 596, FIG. 12) and the programmed system start time (e.g., from memory 590). At step 704 a determination is made whether the current time is the programmed system start time. If the determination is "no", then control returns to step 702 to continue reading the clock. However, if at step 704 it is determined that the current time is the programmed system start time, then at step 706 the controller (e.g., 584, FIG. 12) sends a signal to the main water supply valve solenoid (e.g., solenoid 524) to open the main water supply valve (e.g., valve 522). Then at step 708 the controller 584 sets a then-current sprinkler index "i" equal to the value of "1" (e.g., indicating that sprinkler 400-1 is the then-current sprinkler). (The then-current sprinkler index value can be stored in RAM of memory 590.) At step 710 the controller (e.g., 584, FIG. 12) performs the following operations: initiates a timer for the current elapsed run-time of the then current sprinkler (the elapsed run time can be stored in RAM of memory 590); sends a signal to the sprinkler solenoid valve (associated with the then-current sprinkler, e.g., sprinkler solenoid valve 512-X) to open that sprinkler valve; and sends a sprinkler motor start signal to the sprinkler motor starter (e.g., motor starter 452, FIG. 11) at the then-current sprinkler. At step 712 the controller (584, FIG. 12) reads the then-current sprinkler head position signal from the sprinkler head position determiner at sprinkler i (e.g., sprinkler head position determiner 430-X at sprinkler 400-X, FIG. 12); reads the current flow control valve positioner setting data from memory (e.g., 490) corresponding to then-current sprinkler head position; and sends a control valve positioning signal to the flow control valve positioner (e.g., flow control valve positioner 574, FIG. 12) to adjust flow control valve positioner to the current flow control valve positioner setting. At step 714 the controller (584) reads the flow value data from memory corresponding to then-current sprinkler head position (which data was stored during the individual sprinkler programming mode), and also reads the current flow detection signal from flow detector (e.g., flow detector 494 FIG. 11, or 594 FIG. 12). At step 716 a determination is made whether the current flow (as measured in step 714) is equal to the flow value read from the memory 590 in step 714. If at step 716 it is determined that the current flow is not equal to the recorded flow for the then-current sprinkler head position, then at step 718 a correction signal is sent to the flow control valve positioner (574), and control then returns to step 716 to determine if the correction was sufficient to bring the current flow value to the desired flow value. (Step 716 can be provided with an approximation routine such that if current flow is within a predetermined amount—for example, between 95 percent and 105 percent) of the desired flow, then this is equivalent to a "yes" determination.) If at step 716 it is determined that the current flow is essentially equal to the recorded flow for the then-current sprinkler head position, then control proceeds to step 720 of FIG. 13B. At step 720 (FIG. 13B) a determination is made whether the sprinkler timer (initiated in step 710) has run for at least the duration previously set for the then-current sprinkler. If it is determined (at step 720) that the sprinkler timer has not expired for the then-current sprinkler, then control returns to step 712 (FIG. 13A), and the controller 584 continues to read then-current sprinkler head position data, and to adjust the control valve positioner 574 to achieve the desired flow. However, it at step 720 (FIG. 13B) it is determined that the sprinkler timer has expired for the then-current sprinkler, then at step 722 the controller (584) performs the following steps: sends a signal to the then-current sprinkler solenoid valve (e.g., 512-X) to close the solenoid valve for the then-current sprinkler "i"; sends a motor stop signal to the sprinkler motor starter (e.g., 452, FIG. 11) at sprinkler "i"; and sets the then-current sprinkler index i=i+1. (That is, if at the beginning of step 722 the then-current sprinkler index is set as "2", then at the end of step 722 the then-current sprinkler index "i" is set as "3".) Then at step 724 a determination is made whether the newly-incremented sprinkler index "i" is greater than the number "n" of sprinklers in the system (i.e. whether "i" is equal to n+1). If at step 724 it is determined that the current sprinkler index "i" is not greater than the number of sprinklers in the system, then control returns to step 710 (FIG. 13A) to place the next sprinkler in the system on line and begin the sprinkling program for that sprinkler. However, if at step 724 (FIG. 13B) it is determined that the current sprinkler index "i" is greater than the number of sprinklers in the system, then control proceeds to step 726, and the controller (584, FIG. 12) sends a signal to the main water supply valve solenoid (524) to close the main water supply valve (522). At this point the running of the sprinkling program for the sprinkler system 500 (FIG. 12) program is considered to be complete, and at step 728 (FIG. 13B), control is returned to step 702 to continue checking the clock (596) to determine whether the sprinkling program should be run again.

It will be appreciated that the steps set forth for the flowchart 700 of FIGS. 13A and 13B are exemplary only in order to demonstrate one example of how a sprinkler system program can be performed in order to accomplish desired area-programmable sprinkling by the multi-sprinkler system 500 of FIG. 12. The flowchart 700 can thus include additional steps (e.g., to implement the sprinkler reversing routine described above with respect to the flowchart 370 of FIG. 10), certain steps can be eliminated (e.g., the flow-checking steps of 716 and 718, FIG. 13A), and that the order of certain steps may be rearranged.

It will be further appreciated that most of the variations, alternative configurations and enhancements described above with respect to the first embodiment (generally, the sprinkler system 100 of FIG. 3) can be implemented with respect to the sprinkler system 500 (FIG. 12) of the second embodiment.

Third embodiment: elevation adjustable sprinkler discharge nozzle To achieve area-programmable sprinkling.

In a third embodiment, in order to achieve area-programmable sprinkling, the discharge nozzle at a sprinkler head can be variably elevationally positioned in order to achieve a desired sprinkling pattern over an area to be sprinkled. A disadvantage of a sprinkler in accordance with the third embodiment over the sprinkler systems 100 and 500 of the first and second embodiments is that a sprinkler of the third embodiment will generally achieve constant flow over the entire area to be sprinkled. Thus, the water applied to the area to be sprinkled (as measured in gallons per square foot) by a sprinkler of the third embodiment can vary significantly over the area to be sprinkled.

In general, a sprinkler system in accordance with the third embodiment includes a sprinkler head having a water discharge nozzle and adapted to move between a first sprinkler head position and a second sprinkler head position. (In this case, the area desired to be sprinkled lies within a region bounded by water which can emanate from the sprinkler head between the first and second sprinkler head positions.) The sprinkler system further includes a sprinkler head positioning apparatus (e.g., 121, FIG. 3) adapted to move the sprinkler head between the first and second sprinkler head positions, and a sprinkler head position determiner (e.g., 130, FIG. 3) adapted to determine a current sprinkler head position between the first and second sprinkler head positions. The sprinkler system also includes a discharge nozzle angle of declination positioner adapted to control an angle of declination of the discharge nozzle relative to the sprinkler head, and a discharge nozzle angle of declination position determiner adapted to determine an angle of declination of the discharge nozzle relative to the sprinkler head. The sprinkler system of the third embodiment additionally includes a controller adapted to receive a sprinkler head position signal from the sprinkler head position determiner, and to send an angle of declination control signal to the angle of declination positioner in response thereto. Thus, as the sprinkler head rotates about a fixed base, the angle of declination of the discharge nozzle can be adjusted to extend (or retract) the spray distance from the discharge nozzle to an outer perimeter which defines the area to be sprinkled. A specific example of a sprinkler system in accordance with the third embodiment will now be described with respect to FIG. 14.

Figure 14:
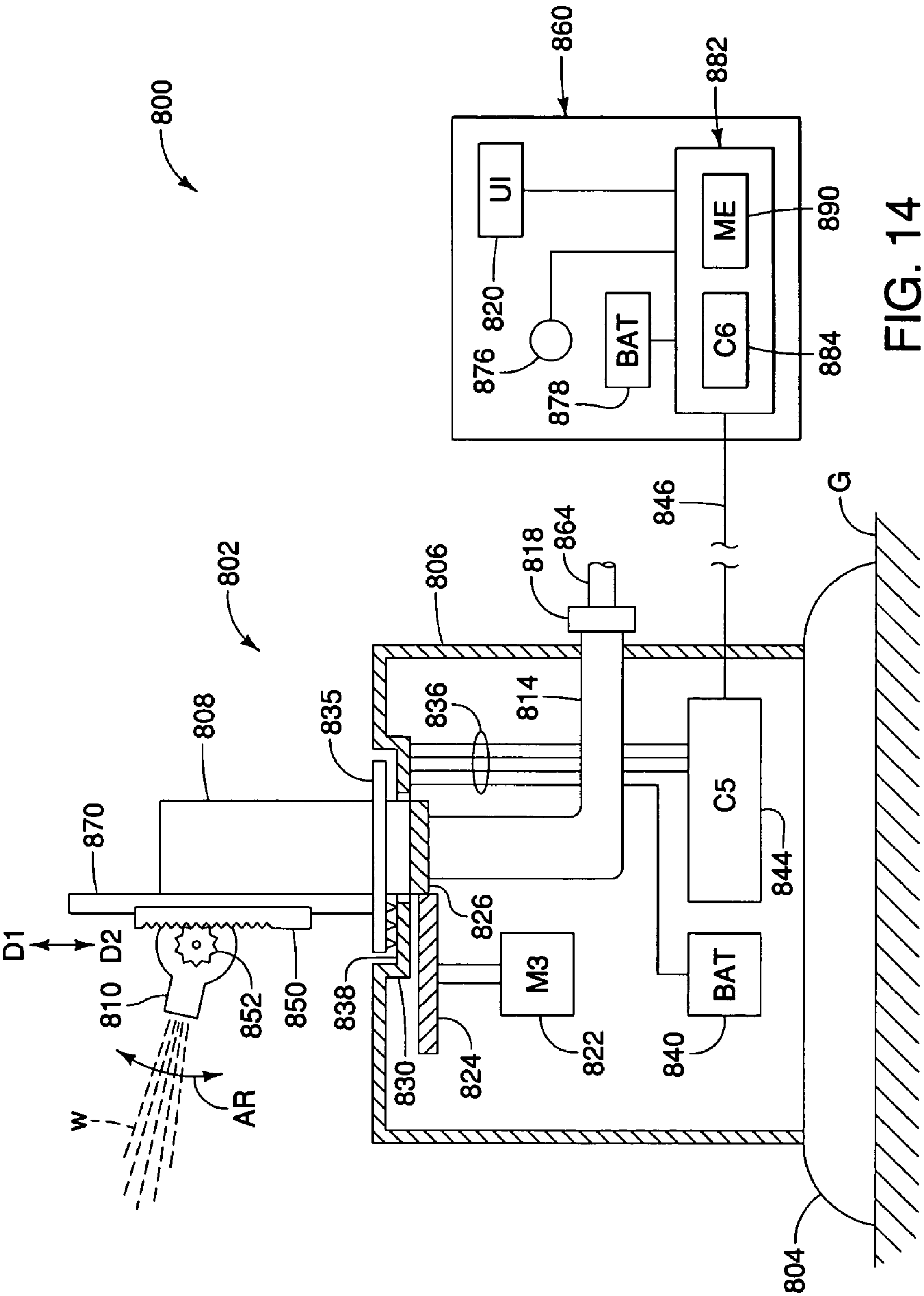
FIG. 14 is a side view schematic diagram depicting a third embodiment of an area-programmable sprinkler system in accordance with the current disclosure.

FIG. 14 is a side view schematic diagram depicting one example of an area-programmable sprinkler system 800 in accordance the third embodiment of the current disclosure. The sprinkler system 800 includes a sprinkler 802 and a main control unit 860. The sprinkler 802 includes a sprinkler head 808 having a water discharge nozzle 810 (which can spray water "W" over an area to be sprinkled), a sprinkler base 804 (which can be supported on ground "G" within or proximate to the area to be sprinkled), and a sprinkler housing 806. Sprinkler head 808 is configured to move rotationally (n plan view) with respect to the fixed sprinkler base 804 and sprinkler housing 806. Sprinkler 802 includes a sprinkler head positioner, here depicted as motor M3 (822) which drives gear 824 and, in turn, gear 826 which is secured around the lower part of the sprinkler head 808. (It will be appreciated in this embodiment that the sprinkler head positioner (motor 822) can be a water motor (i.e., driven by flow of water to the sprinkler head 808) since water flow is not regulated in this embodiment (unlike the first and second embodiments).) The sprinkler head 808 is provided with water from a sprinkler water conduit 814, which can be connected to a main water supply 864 (such as a garden hose, or underground tubing) via water connector 818. Sprinkler 802 can further include a power supply (here, depicted as battery "BAT" (840), and a sprinkler control unit "C5" (844). The power supply 840 can be used to power the discharge nozzle angle of declination position determiner 870 (described more fully below), to provide signal power to the sprinkler head position determiner 830 (also described more fully below), and to provide power to the sprinkler control unit 844.

The sprinkler 802 additionally includes a discharge nozzle angle of declination positioner, which is depicted in FIG. 14 as being a geared rack 870 which drives a pinion gear 852. The geared rack (or discharge nozzle angle of declination positioner) 870 is driven by the discharge nozzle angle of declination position determiner 870, which is depicted here as being a linear motor. Geared rack 870 drives pinion gear 852 is secured to the water discharge nozzle 810, such that as rack 870 is moved in directions D1 and D2 by the linear motor 870, the water discharge nozzle 810 is moved through the arc "AR". In the example depicted the discharge nozzle angle of declination position determiner (linear motor 870) is supported on a sprinkler head platform which rotates along with the sprinkler head 808. The sprinkler 802 further includes a fixed signal deck 838 which can be supported by the sprinkler body 806. The fixed signal deck 838 can include the contact points 256 (FIG. 3A) of a rotary encoder which can be used to implement the sprinkler head position determiner 830 (which can be similar to sprinkler head position determiner 130 of FIG. 3, described above). The fixed deck 838 can also include concentric metallic contact rings so that contact points (shown in FIG. 14, but not numbered) can communicate information between the discharge nozzle angle of declination position determiner 870 and the sprinkler control unit 844 via signal lines 836.

The sprinkler system 800 of FIG. 14 further includes the control module 860, which includes user interface 820, main control unit 882, power supply 878, and a discharge nozzle angle of declination manual position controller 876. The main control unit 822 can include the controller "C6" (884), which can be similar to controller 184 of FIG. 3, and a memory device "ME" (890), which can be similar to memory device 190 of FIG. 3. The control unit 860 of FIG. 14 can communicate with the sprinkler head 802 via signal lines 846, or via a wireless controller (similar to wireless user interface 200' of FIG. 3).

Programming of the sprinkler system 800 of FIG. 14 can proceed in a manner somewhat similar to that as describe above in flowchart 260 (FIG. 6A) for the system 100 of FIG. 3. Specifically, the user connects the sprinkler 802 (FIG. 14) to the water supply 864 and places the sprinkler on the ground "G" in or proximate to the area to be sprinkled. The user opens the main water supply valve (e.g., 167, FIG. 3) to a desired position which will achieve flow to the farthest reach of the area to be sprinkled. (Adjustment of the main supply valve may be performed during the program mode.) The user then enables a "START" or "PROGRAM" feature on the user interface 820, and then uses the discharge nozzle angle of declination manual position controller 876 to direct the discharge nozzle angle of declination positioner 870 to adjust the angle of declination of the discharge nozzle 810 as appropriate to achieve the desired sprinkling of the area. During this time the controller 884 records the then- current discharge nozzle angle of declination position as a function of the sprinkler head position (as determined by the sprinkler head position determiner 830). Once the desired sprinkling program for the area to be watered is achieved, the user can activate a "SET" feature on the user interface 820 to store the sprinkling program in memory 890. Thereafter, in a run mode, the controller can read the sprinkling program from the memory 890 in a manner somewhat similar to that described above with respect to flowchart 280 of FIG. 6B. Specifically, during the run mode the controller 884 reads then-current sprinkler head position data from sprinkler head position determiner 830, reads the corresponding discharge nozzle angle of declination data from the memory 890, and sends a signal to the discharge nozzle angle of declination position determiner 870 to adjust the discharge nozzle angle of declination positioner 850 to achieve the desired sprinkling for the then-current sprinkler head position.

It will be appreciated that the angle-of-declination embodiment of FIG. 14 can also be implemented as a multi-sprinkler system, and that certain optional features described above with respect to the first two embodiments can be used with the third embodiment as well.

While the above embodiments have been described in language more or less specific as to structural and methodical features, it is to be understood, however, that the present disclosure is not limited to the specific features shown and described. Certain of the disclosed embodiments are, therefore, claimed in any of their various forms or modifications within the proper scope of the appended claims as appropriately interpreted in light of the current disclosure, and relevant extrinsic sources.

We claim:

1. A sprinkler system which is controllable to provide water to an area desired to be sprinkled, comprising:

a sprinkler head having a water discharge nozzle and adapted to move between a first sprinkler head position and a second sprinkler head position to thereby apply water to the area desired to be sprinkled;

a sprinkler head positioner adapted to move the sprinkler head between the first and second sprinkler head positions;

a sprinkler head position determiner adapted to determine a current sprinkler head position between the first and second sprinkler head positions;

a flow control valve adapted to control flow of water from a water supply to the water discharge nozzle;

a flow control valve positioner adapted to establish a current control valve position of the flow control valve between an essentially fully closed control valve position and an essentially fully open control valve position; and a controller adapted to receive a sprinkler head position signal from the sprinkler head position determiner and to send a control valve control signal to the flow control valve positioner in response thereto.

2. The sprinkler system of claim 1 and further comprising:

a flow control valve position determiner adapted to determine the current control valve position, and to generate a current flow control valve position signal in response thereto;

a means for a user to position the flow control valve positioner during a program mode in the controller;

a memory device to record a plurality of the current control valve position signals during the program mode; and wherein the controller is further adapted to record in the memory device the plurality of current control valve position signals during the program mode and correlate each of the current control valve position signals with a corresponding current sprinkler head position as determined by a contemporaneous sprinkler head position signal received by the controller, and thereafter use the correlated current control valve position signals and the current sprinkler head position signals from the program mode in a run-mode to send the control valve control signal to the flow control valve positioner.

3. The sprinkler system of claim 2 and wherein the means for the user to position the flow control valve positioner during the programming mode comprises a manual positioned attached to one of the flow control valve or the flow control valve positioner.

4. The sprinkler system of claim 2 and wherein flow control valve positioner is driven by an electrical control valve positioner driver, and the means for the user to position the flow control valve positioner during the programming mode comprises a flow control keypad adapted to drive the electrical control valve positioner driver in response to actuation thereof.

5. The sprinkler system of claim 1 and further comprising:

a water flow detector adapted to determine at least an approximation of water flowing out of the water discharge nozzle and to send a water flow signal to the controller;

and wherein the controller is configured to record a plurality of current water flow signals during a program mode and correlate each of the current water flow signals with a corresponding current sprinkler head position as determined by a contemporaneous sprinkler head position signal received by the controller, and thereafter use the correlated current control valve position signals and the sprinkler head position signals from the program mode in a run-mode to send the control valve control signal to the flow control valve positioner.

6. The sprinkler system of claim 5 and wherein the water flow detector comprises a pressure sensor adapted to detect pressure of water downstream of the flow control valve and prior to the water discharge nozzle.

7. The sprinkler system of claim 5 and wherein the water flow detector comprises a rotary vane disposed in a water conduit between the flow control valve and the water discharge nozzle.

8. The sprinkler system of claim 1 and wherein:

the controller comprises a memory device and a user interface, and the user interface allows a user to operate the controller in one of a program mode or a run-mode;

in the program mode the user interface enables the user to record in the memory device a plurality of desired flow quantities of water emanating from the discharge nozzle, and the controller is adapted to correlate corresponding current sprinkler head positions associated with each of the plurality of desired flow quantities; and in the run-mode, the controller is adapted to use the recorded flow quantities correlated with the corresponding current sprinkler head positions to send the control valve control signal to the flow control valve positioner.

9. The sprinkler system of claim 8 and wherein the user interface comprises a remote control unit configured to wirelessly transmit the plurality of desired flow quantities to the controller.

10. The sprinkler system of claim 8 and wherein:

the sprinkler head positioner comprises a sprinkler head drive device adapted to selectively move the sprinkler head at a first speed and a second speed, and wherein the second speed is faster than the first speed; and the controller comprises a run-mode control program stored within the memory device and configured to run during the run-mode, and the run-mode control program is configured to identify a sprinkler head position corresponding to a recorded flow quantity of essentially zero flow, and to send a signal to the sprinkler head positioner to operate the sprinkler head positioner at the second faster speed until a sprinkler head position is determined which corresponds to a flow of greater than essentially zero flow, at which time the run-mode control program is configured to send a signal to the sprinkler head positioner to operate the sprinkler head positioner at the first speed.

11. The sprinkler system of claim 8 and wherein:

in a plan view the sprinkler head is configured to rotate through a circular arc of 360 degrees, such that the first and second sprinkler head positions correspond to positions of zero degrees and 360 degrees within the circular arc;

the sprinkler head positioner comprises a sprinkler head drive device adapted to selectively reverse a direction of rotation of the sprinkler head between the first and second sprinkler head positions; and the controller comprises a run-mode control program stored within the memory device and configured to run during the run-mode, and the run-mode control program is configured to identify a largest area between the first and second sprinkler head positions which corresponds to a region of recorded flow quantity of essentially zero flow, and to send a signal to the sprinkler head positioner to reverse the direction of rotation of the sprinkler head upon encountering the sprinkler head position corresponding to an initiation of the largest area between the first and second sprinkler head positions which corresponds to a region of recorded flow quantity of essentially zero flow.

12. The sprinkler system of claim 1 and wherein the flow control valve, the flow control valve positioner, and the controller are integrated into a control unit adapted to be connected to a water supply, and the sprinkler head is adapted to be connected to the control unit via a water conduit.

13. The sprinkler system of claim 12 and wherein the water supply comprises a faucet, and the water conduit comprises a garden hose.

14. The sprinkler system of claim 1 and wherein in a plan view the sprinkler head is configured to rotate through a circular arc of 360 degrees, such that the first and second sprinkler head positions correspond to positions of zero degrees and 360 degrees within the circular arc.

15. The sprinkler system of claim 1 and further comprising a keyed base adapted to be placed in a fixed position relative to the area to be sprinkled, and wherein the keyed base is further adapted to receive the sprinkler head, and the keyed base comprises a key feature to ensure that the sprinkler head position determiner is oriented in a common position relative to the area to be sprinkled each time the keyed base receives the sprinkler head.

16. The sprinkler system of claim 1 and wherein the flow control valve consists of one of a ball valve adapted to rotate through approximately 90 degrees between the essentially fully closed control valve position and the essentially fully open control valve position, or a globe valve having a stem adapted to rotate through approximately 360 degrees between the essentially fully closed control valve position and the essentially fully open control valve position.

17. A sprinkler system which is controllable to provide water to an area desired to be sprinkled, comprising:

a plurality of sprinkler heads, each sprinkler head adapted to move between a first sprinkler head position and a second sprinkler head position to thereby apply water to the area desired to be sprinkled, each sprinkler head comprising:

a water discharge nozzle;

a sprinkler head positioner adapted to move the sprinkler head between the first and second sprinkler head positions; and a sprinkler head position determiner adapted to determine a current sprinkler head position between the first and second sprinkler head positions;

a sprinkler water manifold comprising:

a water supply connection adapted to be connected to a water supply:

a plurality of water outlet conduits, each water outlet conduit in fluid communication with a respective sprinkler head; and a plurality of sprinkler selector valves configured to selectively place each water outlet conduit in fluid communication with the water supply connection;

a flow control valve disposed between the water supply connection and the sprinkler selector valves, and adapted to control flow of water from the water supply to the water outlet conduit currently selected by a one of the sprinkler head selector valves;

a flow control valve positioner adapted to establish a current control valve position of the flow control valve between an essentially fully closed control valve position and an essentially fully open control valve position;

a flow control valve position determiner adapted to determine the current control valve position, and to generate a current flow control valve position signal in response thereto;

a controller adapted to selectively receive a sprinkler head position signal from each sprinkler head position determiner and to send a control valve control signal to the flow control valve positioner in response thereto;

a means for a user to position the flow control valve positioner during a program mode in the controller;

a memory device to record a plurality of the current control valve position signals during the program mode; and wherein the controller is further adapted to record in the memory device the plurality of current control valve position signals during the program mode for each sprinkler head and to correlate each of the current control valve position signals with a corresponding current sprinkler head position as determined by a contemporaneous sprinkler head position signal received by the controller, and thereafter use the correlated current control valve position signals and the current sprinkler head position signals from the program mode in a run-mode to send the control valve control signal to the flow control valve positioner.

* * * * *